US005615130A

United States Patent [19]
Bolan et al.

[11] Patent Number: 5,615,130
[45] Date of Patent: Mar. 25, 1997

[54] SYSTEMS AND METHODS TO GATHER, STORE AND TRANSFER INFORMATION FROM ELECTRO/MECHANICAL TOOLS AND INSTRUMENTS

[75] Inventors: Michael L. Bolan, Dallas; Nicholas M.G. Fekete, Richardson, both of Tex.

[73] Assignee: Dallas Semiconductor Corp., Dallas, Tex.

[21] Appl. No.: 355,934

[22] Filed: Dec. 14, 1994

[51] Int. Cl.⁶ .................................................. G06F 17/00
[52] U.S. Cl. ........................ 364/505; 364/508; 364/480; 364/551.02; 439/13; 439/577; 439/483; 73/761
[58] Field of Search ................................. 364/508, 505, 364/551.02, 468, 507, 480; 73/761, 847, 862.23; 29/407.02, 407.01; 439/13, 577, 483; 395/200.01; 361/601, 715, 728

[56] References Cited

U.S. PATENT DOCUMENTS

| | | | |
|---|---|---|---|
| 3,859,638 | 1/1975 | Hume, Jr. | 365/229 |
| 4,007,355 | 2/1977 | Moreno | 235/492 |
| 4,086,752 | 5/1978 | Kishimoto | 368/88 |
| 4,196,577 | 4/1980 | Ohno et al. | 368/88 |
| 4,211,919 | 7/1980 | Ugon | 235/488 |
| 4,244,213 | 1/1981 | Marcinkiewicz | 73/139 |
| 4,259,869 | 4/1981 | Carlin | 73/761 |
| 4,375,120 | 3/1983 | Sigmund | 29/407 |
| 4,399,524 | 8/1983 | Mugurama | 365/229 |
| 4,400,711 | 8/1983 | Avery | 357/48 |
| 4,426,159 | 1/1984 | Kosaka et al. | 368/88 |
| 4,426,887 | 1/1984 | Reinholm et al. | 73/862.23 |
| 4,450,727 | 5/1984 | Reinholm et al. | 73/862.23 |
| 4,471,345 | 9/1984 | Barrett, Jr. | 340/825.32 X |
| 4,475,178 | 10/1984 | Kinoshika | 365/203 |
| 4,480,178 | 10/1984 | Miller et al. | 235/380 |
| 4,511,796 | 4/1985 | Aigo | 235/492 |
| 4,583,111 | 4/1986 | Early | 307/303.2 |
| 4,595,941 | 6/1986 | Avery | 357/23.13 |
| 4,616,343 | 10/1986 | Ogawa | 365/203 |
| 4,617,473 | 10/1986 | Bingham | 365/229 |
| 4,621,190 | 11/1986 | Saito et al. | 235/492 |
| 4,645,943 | 2/1987 | Smith, Jr. et al. | 307/150 |
| 4,683,372 | 7/1987 | Matsumoto | 235/492 |
| 4,691,202 | 9/1987 | Dume et al. | 340/825.54 |
| 4,717,817 | 1/1988 | Grass | 235/441 |
| 4,730,121 | 3/1988 | Lee et al. | 307/66 |
| 4,742,470 | 5/1988 | Jueugel | 340/825.54 X |
| 4,748,320 | 5/1988 | Yorimoto et al. | 235/492 |
| 4,780,707 | 10/1988 | Selker | 235/472 |
| 4,800,590 | 1/1989 | Vaughan | 380/25 |
| 4,815,112 | 3/1989 | Kuze | 377/26 |
| 4,816,656 | 3/1989 | Nakano et al. | 235/380 |

(List continued on next page.)

FOREIGN PATENT DOCUMENTS

| | | | |
|---|---|---|---|
| 0147099 | 3/1985 | European Pat. Off. | 340/825.35 |
| 5267674 | 6/1977 | Japan | 368/88 |
| 62-125659 | 6/1987 | Japan | 357/48 |
| 63-190374 | 8/1988 | Japan | 357/48 |

*Primary Examiner*—Emanuel T. Voeltz
*Assistant Examiner*—Hien Vo
*Attorney, Agent, or Firm*—Jenkens & Gilchrist, P.C.

[57] ABSTRACT

A fastener and corresponding communication system comprises a first fastener having a first end and a second fastener having a second end. The first fastener has an integrated circuit positioned to be electrically coupled to a first communication interface on the first end of the fastener. The second end also has a second communication interface, the first communication interface and the second communication interface electrically coupled together when the first fastener and the second fastener are fastened together. The first fastener preferably has a hollow cavity therethrough and the integrated circuit is positioned inside the first fastener. At least one electrical signal line, preferably only one, exists through the hollow cavity in communication with the integrated circuit. The method comprises coupling a first fastener and a second fastener together and receiving and transmitting information via a first signal line and a second signal line extending through the first fastener and the second fastener to an integrated circuit positioned in the first fastener.

10 Claims, 16 Drawing Sheets

U.S. PATENT DOCUMENTS

| | | | |
|---|---|---|---|
| 4,827,478 | 5/1989 | Chan | 371/38 |
| 4,845,351 | 7/1989 | Hara et al. | 235/492 |
| 4,845,609 | 7/1989 | Lighthurt et al. | 395/425 |
| 4,862,501 | 9/1989 | Kamitake et al. | 380/50 |
| 4,868,409 | 9/1989 | Tanaka et al. | 70/278 |
| 4,870,401 | 9/1989 | Lee et al. | 340/825.31 |
| 4,885,788 | 12/1989 | Takaragi et al. | 380/23 |
| 4,887,234 | 12/1989 | Iijima | 395/425 |
| 4,908,790 | 3/1990 | Little et al. | 365/229 |
| 4,928,001 | 5/1990 | Masada | 235/380 |
| 4,943,804 | 7/1990 | Lee et al. | 340/825.34 |
| 4,948,954 | 8/1990 | Dias | 235/492 |
| 4,970,408 | 11/1990 | Hanke et al. | 307/272.3 |
| 4,980,746 | 12/1990 | Harrington, III | 357/48 |
| 4,982,371 | 1/1991 | Bolan et al. | 365/228 |
| 4,989,261 | 1/1991 | Lee | 455/127 |
| 5,010,331 | 4/1991 | Dias et al. | 340/825.31 |
| 5,013,898 | 5/1991 | Glasspool | 235/449 |
| 5,019,736 | 5/1991 | Furtek | 307/303.2 |
| 5,027,008 | 6/1991 | Runaldue | 307/272.3 |
| 5,032,708 | 7/1991 | Comerford et al. | 235/492 |
| 5,039,875 | 8/1991 | Chang | 307/272.3 |
| 5,044,964 | 9/1991 | Minerd et al. | 439/67 |
| 5,045,675 | 9/1991 | Curry | 235/441 |
| 5,049,728 | 9/1991 | Rovin | 235/492 |
| 5,111,058 | 5/1992 | Martin | 365/229 |
| 5,121,359 | 6/1992 | Steele | 365/229 |

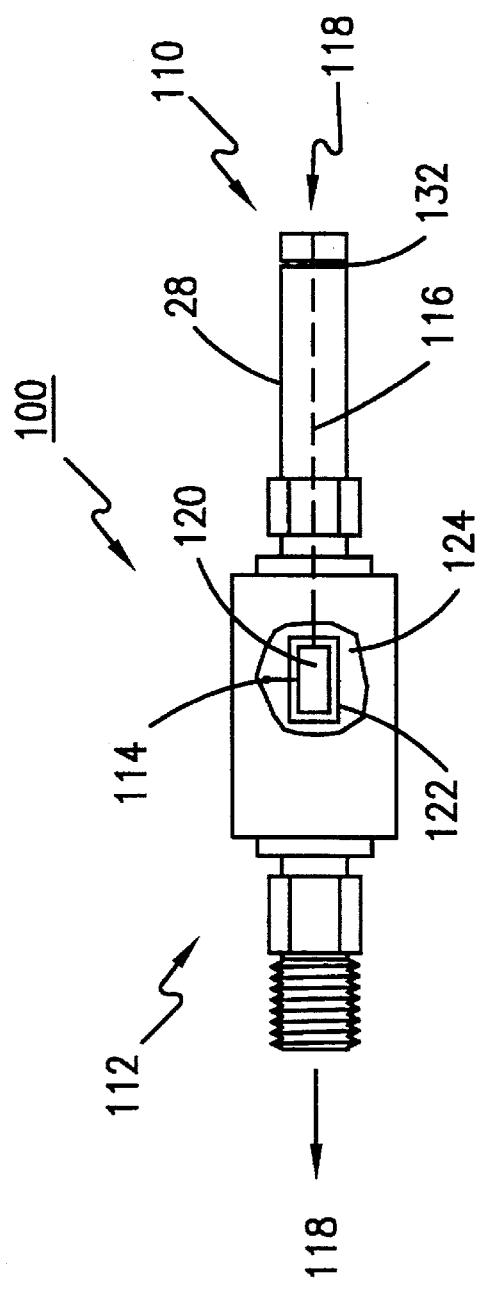
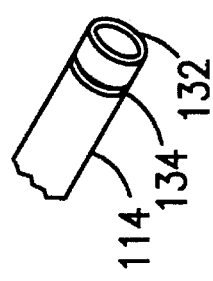
FIG. 1A
FIG. 1B

EQUIVALENT CIRCUIT
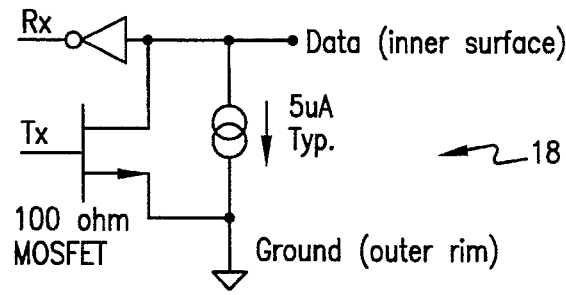
FIG. 5J
BUS MASTER CIRCUIT
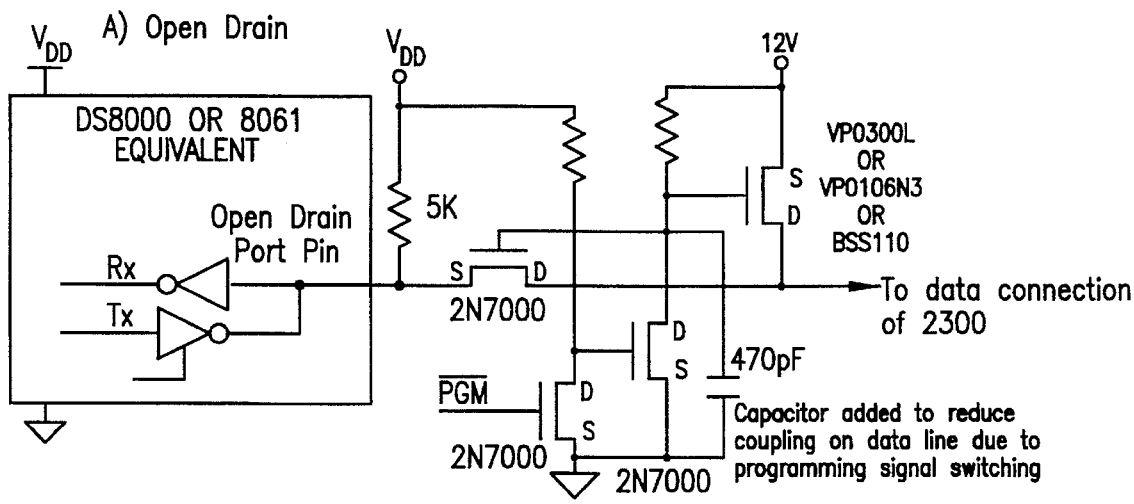
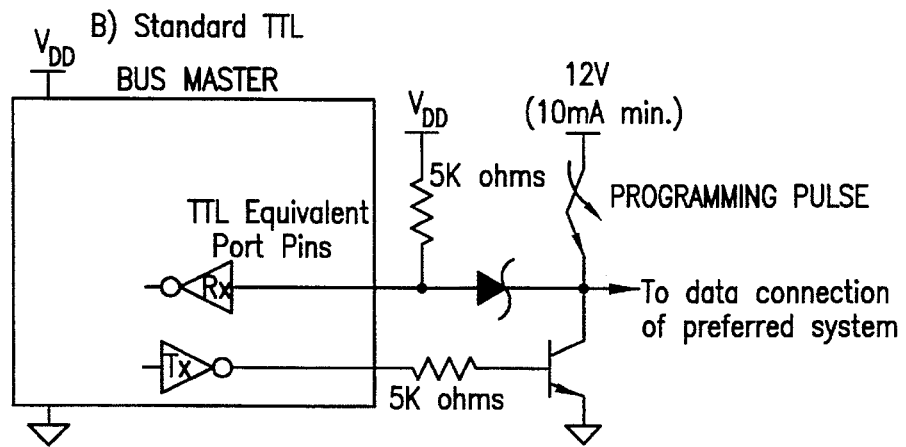
FIG. 5K

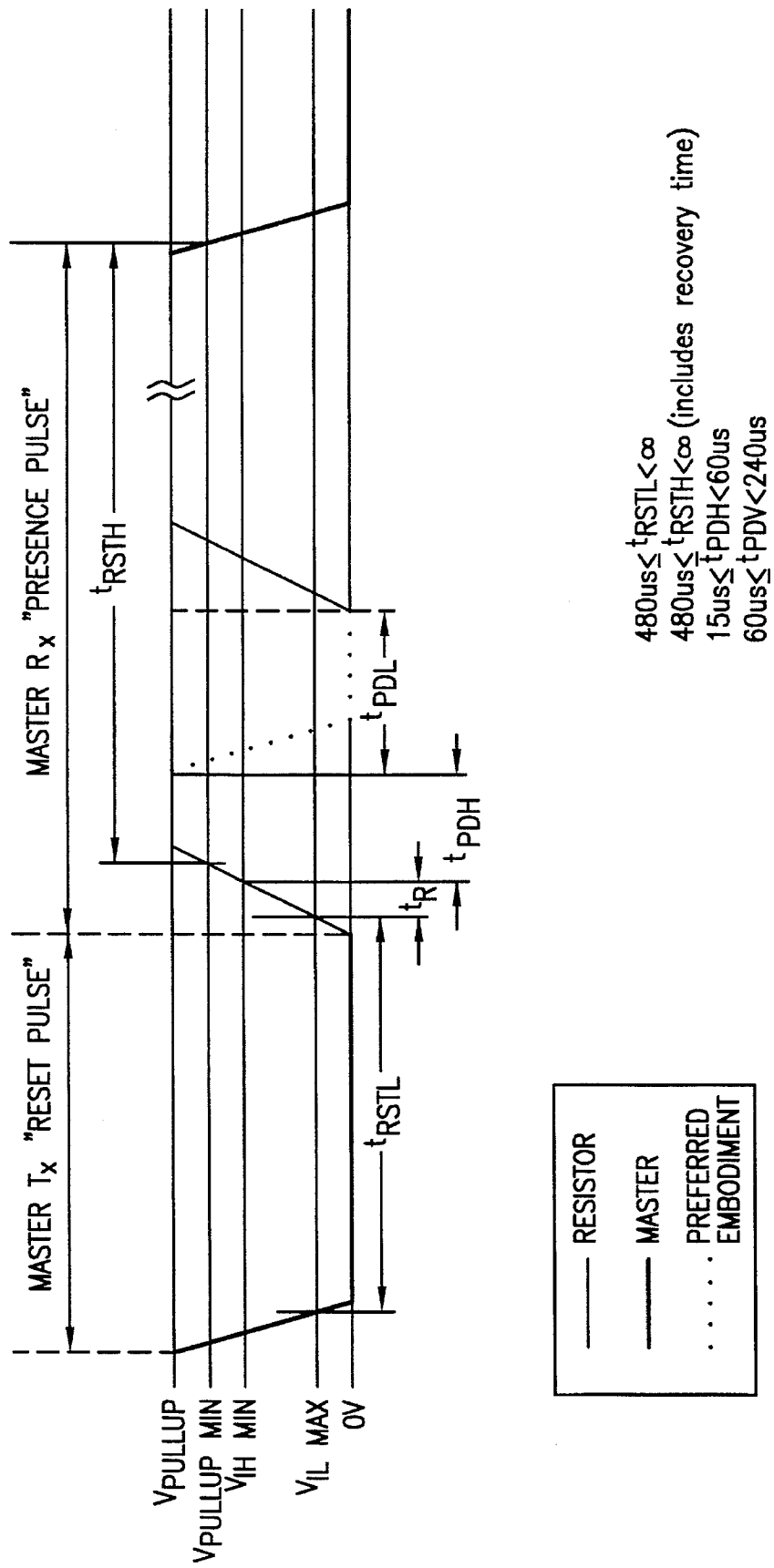

SYSTEMS AND METHODS TO GATHER, STORE AND TRANSFER INFORMATION FROM ELECTRO/MECHANICAL TOOLS AND INSTRUMENTS

PARTIAL WAIVER OF COPYRIGHT PURSUANT TO 1077 O.G. 22(Mar. 20, 1987)

(C) Copyright, Dallas Semiconductor Corporation 1994. All of the material in this Patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to tile extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

CROSS-REFERENCE TO RELATED APPLICATIONS

This application hereby incorporates by reference the following co-assigned issued patents and patent applications:

| Serial No./ Patent No. | Filing Date/ Issue Date | DSC Case No. | Authors |
| --- | --- | --- | --- |
| 4,862,310 | 04-29-88/08-29-89 | DSC-77 | Harrington |
| 5,210,846 | 05-15-89/05-11-93 | DSC-83 | Lee |
| 08/019,932 | 02-19-93 | DSC-83A | Lee |
| 4,982,371 | 05-15-89/01-01-91 | DSC-85 | Lee et al. |
| 07/632,227 | 12-20-90 | DSC-85A | Lee et al. |
| 5,091,771 | 05-15-89/11-18-91 | DSC-86 | Bolan et al. |
| 4,972,377 | 05-15-89/11-20-90 | DSC-107 | Lee |
| 5,191,554 | 08-27-91/03-02-93 | DSC-107A | Lee |
| 5,181,091 | 09-16-91/01-19-93 | DSC-153A | Harrington et al. |
| 4,945,217 | 05-15-89/07-31-90 | DSC-157 | Bolan |
| 5,025,141 | 07-17-90/06-18-91 | DSC-157A | Bolan |
| 4,948,954 | 05-15-89/08-14-90 | DSC-158 | Dias |
| 4,983,820 | 08-14-90/01-08-91 | DSC-158A | Dias |
| 5,045,675 | 05-15-89/09-03-91 | DSC-159 | Steve Curry |
| 4,995,004 | 05-15-89/02-19-91 | DSC-160 | Lee |
| 07/657,717 | 02-19-91 | DSC-160A | Lee |
| 07/725,793 | 07-09-91 | DSC-175 | Curry et al. |
| 07/998,978 | 12-30-92 | DSC-175A | Curry et al. |
| 07/527,492 | 05-22-90 | DSC-268 | Bolan et al. |
| 5,206,905 | 11-19-90/04-27-93 | DSC-303 | Lee et al. |
| 07/615,615 | 11-19-90 | DSC-304 | Lee et al. |
| 5,226,137 | 11-19-90/07-06-93 | DSC-305 | Lee et al. |
| 07/882,244 | 05-08-92 | DSC-306 | Lee |
| 07/631,929 | 12-19-90 | DSC-316 | Curry et al. |
| 07/728,230 | 07-10-91 | DSC-317 | Pearson et al. |
| 07/727,618 | 07-10-91 | DSC-319 | Williams et al. |
| 07/727,619 | 07-10-91 | DSC-322 | Rodriguez et al. |
| 07/727,638 | 07-10-91 | DSC-324 | Ni et al. |
| 08/103,724 | 08-09-93 | DSC-352 | Pearson et al. |
| 07/727,639 | 07-10-91 | DSC-353 | Bolan et al. |
| 5,166,545 | 07-10-91/11-24-92 | DSC-356 | Harrington |
| 08/022,258 | 02-24-93 | DSC-377 | Bolan et al. |
| 08/031,776 | 03-15-93 | DSC-377A | Bolan et al. |
| 08/015,506 | 02/09/93 | DSC-393 | Harrington et al. |
| 08/262,071 | 06/15/94 | DSC-419 | Harrington et al. |
| 08/234,210 | 04/28/94 | DSC-427 | Fekete et al. |
| 08/247,941 | 05/24/94 | DSC-408 | Curry et al. |
| 08/342,068 | 11/18/94 | DSC-460 | Cusy et al. |
| 08/336,341 | 11/08/94 | DSC-461 | Hass et al. |

In addition, the data sheets for the following parts manufactured by Dallas Semiconductor Corporation: DS1990, DS1991, DS1993, DS1982, DS2401, DS2405, and DS1982, as well as other documents discussed below.

FIELD OF INVENTION

The present invention relates generally to systems and methods to gather, store, and transfer information from electro/mechanical tools and instruments.

SUMMARY OF THE INVENTIONS

The present invention provides improved systems and methods to gather, store, and transfer information from electro/mechanical tools and instruments, such as air driven power tools (e.g., drills, ratchets, etc.) to and from host computer systems. The host computer systems, in turn, can store information gathered from tools and the like, such as the maintenance information, number of times the tool has been used, cycle time, job verification, and particular features pertaining to the tool itself, such as gear ratio information, torque information, accuracy, strength, ergonomic information, etc. Among other reasons, the availability of this information allows the host computer or control system to monitor and adjust the gearing information associated with the torque of a particular tool or instrument being used and to dynamically control the torque of the tool, so that one does not accidentally overtight or undertight a particular nut or bolt. The presence of this information and its use in this fashion also enhances the safety for the person using the tool as well as for the person relying on the equipment on which the tool is being used.

Preferred embodiments comprise a communication system a first fastener (or coupler) having a first end and a second fastener (or coupler) having a second end. The first fastener has an integrated circuit positioned in or on selected locations of the first fastener, which is preferably electrically coupled to a first communication interface on the first end of the first fastener. The second end of the second fastener also has a communication interface. The first communication interface and the second communication interface are electrically coupled together when the first fastener and the second fastener are mechanically fastened together.

Preferred embodiments of the first fastener generally have a hollow cavity therethrough and the integrated circuit is preferably positioned inside the first fastener in the hollow cavity itself or otherwise embedded in a cavity in the first fastener itself. At least one electrical signal line extends through the hollow cavity in communication with the integrated circuit. At least one second signal line is electrically coupled to the second end of the second fastener as well. Other insulated wires, including other power kines or other signal lines, may also be strung through the hollow cavity as well. The signal lines should be small enough, so as to not interfere with air or gaseous compounds that may travel through the hollow cavity, which may ultimately powers a power tool.

Preferred integrated circuits are packaged in a plastic package having at least two leads extending therefrom. One of the two leads is coupled to one electrical first signal line of the at least one first signal line and to the integrated circuited packaged in the plastic package. Preferred embodiments of the integrated circuit comprises an energy source, memory electrically coupled to the energy source, input logic operatively electrically coupled to the at least one signal line, and output logic operatively electrically coupled to provide information stored in the memory in response to signal or command sent via the at least one signal line. The preferred protocol and command structure is discussed in great detail below. The output logic is electrically coupled to the semiconductor memory and the energy source.

Preferred embodiments of the interface provide a first conductive surface that carries specific signals (e.g., data, clock) and a second conductive surface that carries a reference signal (e.g., ground) that are mutually isolated from one another. Both the first conductive surface and the second conductive surface are electrically directly or indirectly coupled to the integrated circuit. Note, however, one conductive surface (e.g., ground) may merely be common with the ground contact of the integrated circuit or host system. One preferred embodiment isolates the first conductive surface with the second conductive surface by positioning the first conductive surface at one end and then positioning the second conductive surface proximate to the end, but not actually at the end itself. Since preferred embodiments of the first fastener have a hollow cavity that is generally circular or cylindrical in shape, it is possible to position the first conductive surface around the perimeter of the end of the first fastener and then position the second conductive surface back from the end of the first fastener. Likewise, the first conductive surface positioned around the perimeter of the first end of the first fastener will preferably rest in a seated region that is electrically conductive and coupled to the first electrical contact of the second fastener, but isolated from the second electrical contact of the second fastener. The first electrical contact of the second fastener is also electrically isolated and/or insulated from the second electrical contact of the first fastener.

It is important to note that preferred embodiments of the first fastener and second fastener may be, in turn, mechanically connected and electrically coupled to other items as well. For instance, the first fastener may be mechanically connected to an air motor and a second fastener may be mechanically connected to a drill bit or to a drill or motorized ratchet, etc. Likewise, the first fastener and/or second fastener may merely be connected to an air hose that is, in turn, coupled to an air motor, which provides the needed pressurized air to power various air tools. In addition, the integrated circuit may or may not be coupled to a host system, which can be based on a personal computer, via a first conductive wire and a second conductive wire. A number of different ways can be used to mechanically align and connect the first fastener and the second fastener.

Preferred embodiments provide a mechanism to gather, store, and transfer various types information, especially when tools are dissembled, disconnected, and/or unfastened, which conventional systems are not equipped to do. The types of information includes, but is not limited to, maintenance records, number of uses, features of the tools themselves (e.g., gear ratio information, torque information, accuracy, strength, number of revolutions), ergonomic information, cycle time, job verification, gear rotation, output information. As discussed in the article by Allan Benson, with the following cite Benson, *Tools of the (Assembly) Trader* ASSEMBLY, Vol. 37, No. 9, (October 1994), at 12–18, which is herein incorporated by reference, this type of information and the availability of this type of information will become more critical in the years ahead as tools, particularly power tools, are reengineered and redesigned. Other advantages relate to use of Dallas Semiconductor's 1-wire™ technology, the assignee of this patent application, which provides an efficient, enabling technology to address the problems. Preferred embodiments of the integrated circuit provide for a time stamp, a presence detect, a parasitic powered device, ample memory to store relevant and needed information, and a minimal number of contacts to and from the integrated circuit to the fastener and/or to and from the fastener to the host system.

BRIEF DESCRIPTION OF THE DRAWINGS

Further features and advantages will become apparent from the following and more particular description of the various embodiments of the invention, as illustrated in the accompanying drawings, wherein:

FIGS. 1A and 1B is a preferred configuration of first fastener 100 having first end 110, integrated circuit 120, first conductive lead contact 116, and second conductive lead contact 114;

FIG. 5J is a circuit diagram showing the actual circuit which an equivalent circuit is shown in FIG. 5A, which shows an open drain part;

FIG. 5K is a set of two circuit diagrams for bus master circuit module 26 in an open drain formulation and a standard TTL formulation;

FIG. 5N is a timing diagram showing the initialization sequence required to begin any communication with the preferred system embodiments.

DETAILED DESCRIPTION OF THE PREFERRED EMBODIMENTS

Figure 2:
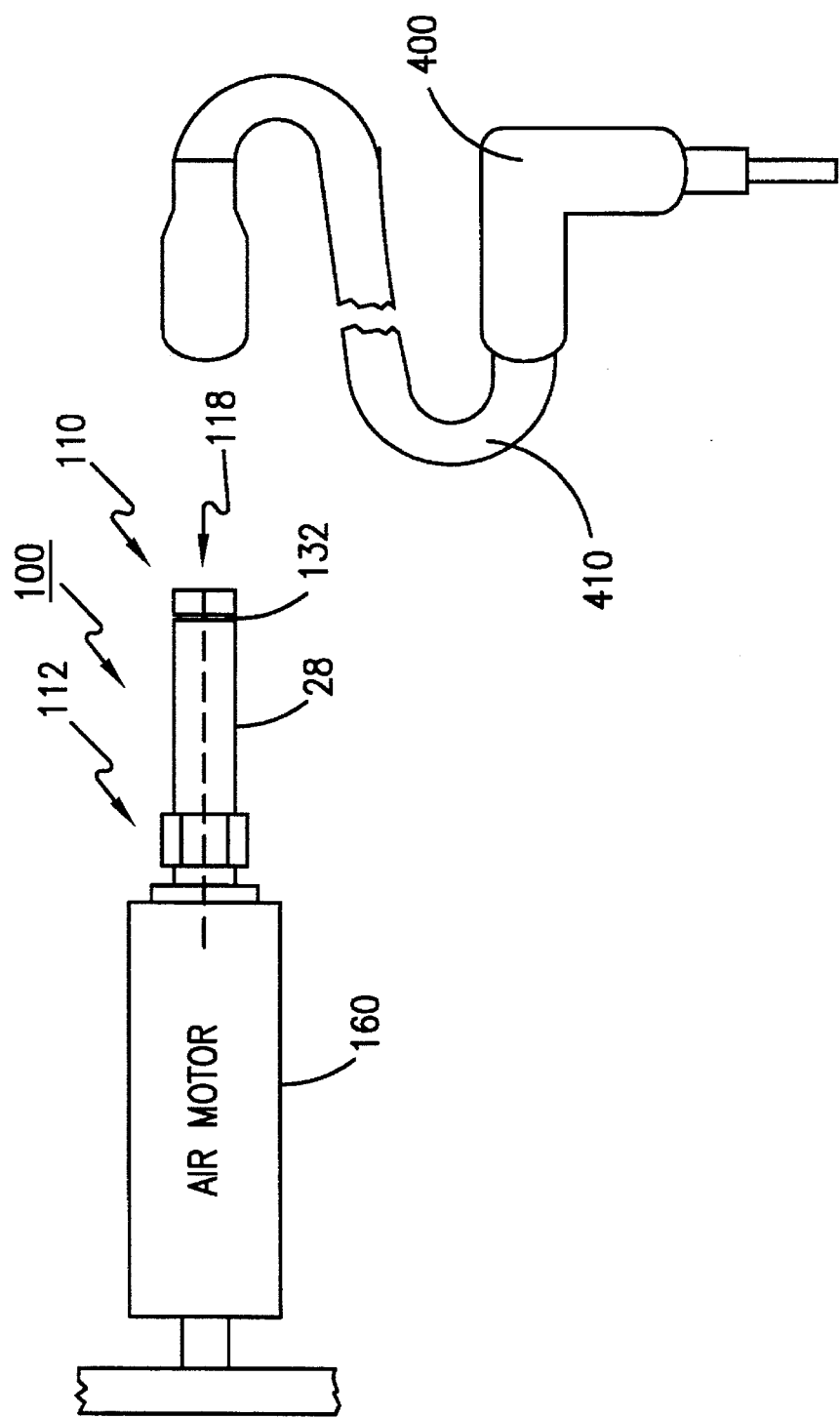
FIG. 2 is a preferred configuration of first fastener 100 having first end 110, first conductive contact lead contact 116, second conductive lead contact 114, when the first fastener 100 is attached to a air motor 160.

Referring to FIGS. 1A and 1B, preferred configurations of first fastener 100 generally have at least one first end 110 and at least one second end 112. In other words, alternate preferred embodiments may have plurality of first ends 110 extending from first fastener 100 and one second end 112; a plurality of second ends 112 extending from first fastener 100 and one first end 110; of a plurality of first ends 110 and a plurality of second ends 112 extending from first fastener 100. This flexibility enables fastener 100 to attach to a number of different physical items (e.g., hoses, tools, computers, etc.) simultaneously, if necessary. As will be discussed below, fastener 100 may fasten, attach, or interlock to another fastener or apparatus (e.g., hose, power tool, air motor, etc.).

While not necessary, preferred fasteners 100 generally have a hollow cavity 118 therethrough. Hollow cavity 118 generally provides for air to flow through fastener 100 in order to power tools (not shown in FIGS. 1A and 1B, but see FIG. 3). Hollow cavity 118 also provides a protective region for integrated circuit 120 in package 120 to be housed to protect integrated circuit 120 from the environment, etc. Integrated circuit 120 is preferably packaged in a plastic package 122 and/or affixed to, a planar labeling device 124 to an interior surface of hollow cavity 118. As discussed below, fastener 100 provides a communication interface in conjunction with integrated circuit 120 and the communication protocol utilized by integrated circuit 120. The communication interface provided in fastener 100 is naturally compatible with a communication interface provided in another fastener or apparatus (see FIGS. 2 and 3), so that data can be transferred across the mechanical connection.

Preferred embodiments of integrated circuit 120 use a Dallas Semiconductor's proprietary one-wire™ technology, the assignee of this patent application, which was developed entirely by Dallas Semiconductor Corporation, the assignee of this case, and is described in great detail in the numerous patents and patent applications incorporated by reference above. Relevant portions are repeated below in reference to the communication protocol preferably used by preferred fasteners. As a result, preferred embodiments of integrated circuit 120 have a first conductive lead contact 116 and second conductive contact 114. As will be explained below, first conductive lead contact 114 provides a reference voltage (e.g., ground) and, if fastener 100 is conductive, it may be attached directly to the interior surface of fastener 100 (as shown). Alternatively, first conductive lead contact 114 may be electrically coupled to a conductive path (e.g., wire), which is not shown in FIGS. 1A and 1B, that is strung through hollow cavity 118 of fastener 100 and connected to a reference source (e.g., ground) elsewhere. Likewise, second conductive lead 116 is preferably electrically coupled via a path (e.g., conductive path, such as an insulated wire) to second contact positioned at or around the first end 110 of fastener 100, preferably around the perimeter 132 (as shown in FIG. 1B). It is important to note that first contact 114 and second contact 116 are insulated from one another, so that second contact 116 is electrically coupled to conductive region positioned at the tip of first end 110 at or substantially around the perimeter 132 is electrically isolated (or insulated) from first conductive contact 114 (e.g., ground), which, as discussed above, if the actual shell or body of the fastener is conductive, is the actual shell or body of fastener 100 itself. As a result, preferred embodiments insulate first conductive contact 114 from second conductive contact 116 with insulation barrier 134. In addition, note that first conductive contact 114 and second conductive contact 116 can also be strung combined together in a common flexible ribbon cable and strung through the hose, fastener 100, fastener 200, etc. to couple a power tool to integrated circuit 120, of integrated circuit 120 to a power tool, etc. This relates again to a major advantage of the Dallas Semiconductor's 1-wire™ technology, which is that the number of needed electrical contacts (and, thus, the corresponding number of insulated wires or ribbon size) is kept to a minimum.

Also note, as shown in FIG. 1A, the nature of the first end 110 and second end 112 may vary. In particular, first end 110 and second end 112 may be threaded to screw into another fixture (as shown in FIG. 2) or another fastener (not shown) or may have smoothed region 28 to allow a male end to be inserted to a female end or into a hose (e.g., air) or similar apparatus (e.g., air motor, see FIG. 2). Likewise, circular ribs may extend around the end to grip a hose, etc. FIG. 2 is a preferred configuration of first fastener 100 having second end 110 and second end 112 when first fastener 100 is attached to a air motor 160. Hose 410 may be connected to second fastener 200, extending to power tool 400 to provide needed power and the like.

Figure 3:
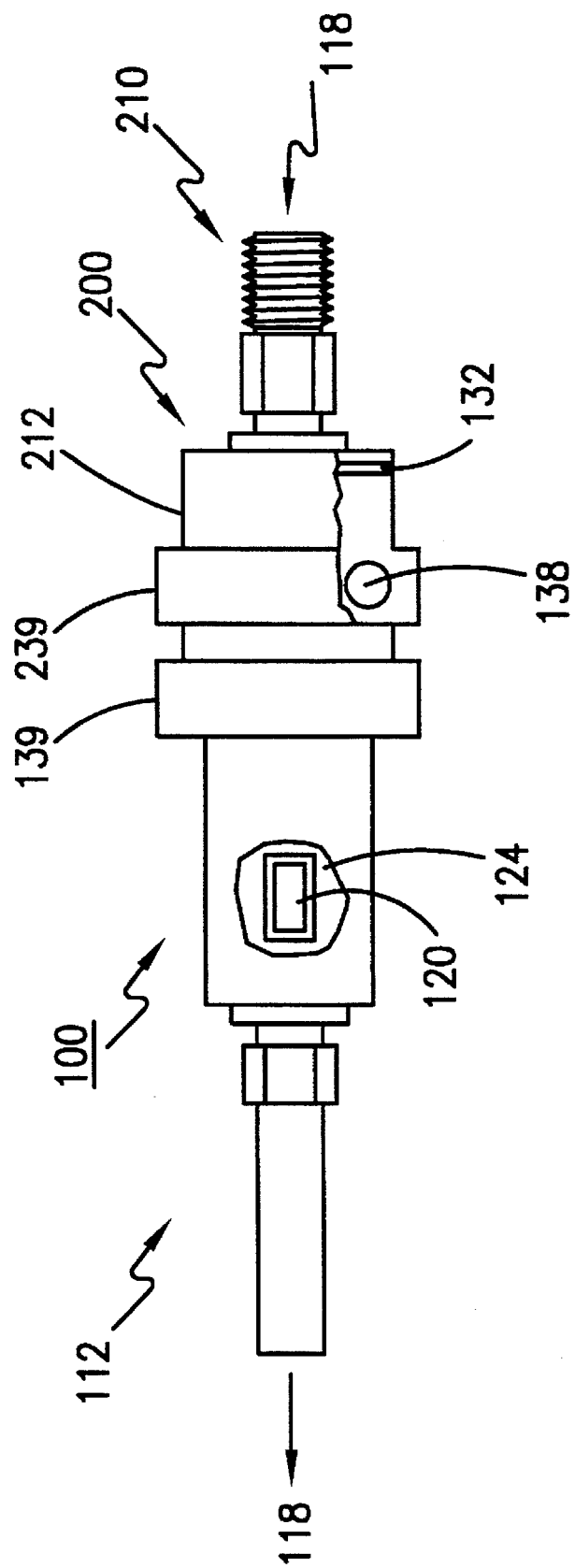
FIG. 3 is a preferred configuration of first fastener 100 coupled to second fastener 200.

FIG. 3 is a preferred configuration of first fastener 100 coupled to second fastener 200. Note second fastener 200 also has first end 210 and second end 212 and that second end 212 of second fastener 200 interlocks with first end 110 of first fastener 100 using ball bearing 138 to hold first fastener 100 and second fastener 200 in place.

Figure 4A:
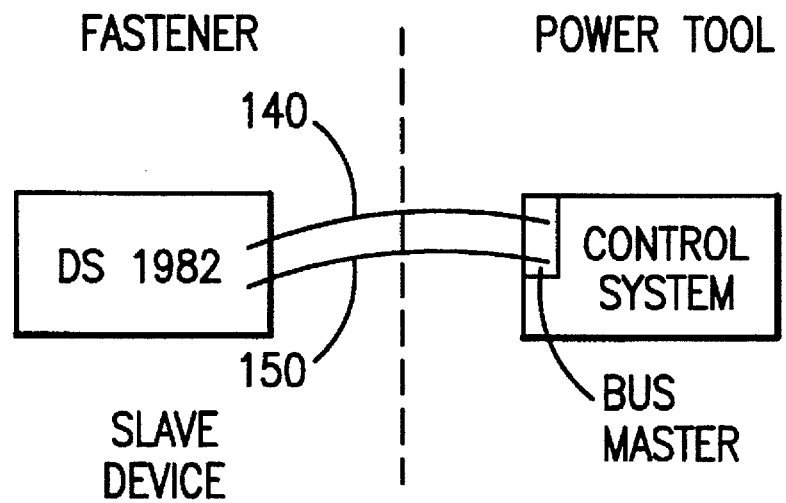
FIGS. 4A and 4B are preferred block diagrams of integrated circuit 100 electrically coupled to a control system 300 for a power tool and/or first conductive contact 140 and second conductive contact 150 electrically coupled to host computer system 400.
Figure 4B:
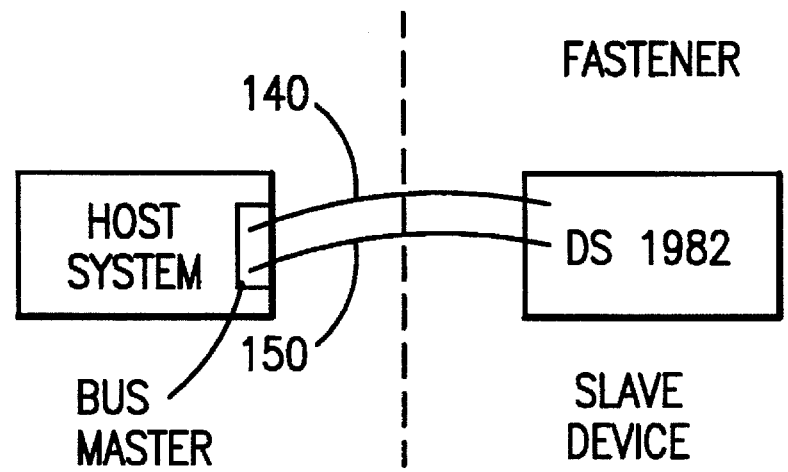

FIGS. 4A and 4B are preferred block diagrams of integrated circuit 100 electrically coupled to a control system 300 for a power tool and/or first conductive contact 140 and second conductive contact 150 electrically coupled to host computer system 400.

Regarding integrated circuit 120, preferred embodiments utilize circuitry found in DS1982, which is product manufactured by Dallas Semiconductor Corporation, the data sheet of which is incorporated by reference. As discussed above, U.S. Patent Applications having Ser. Nos. 08/262, 071 and 08/342,068 (DSC-419 and DSC-460) describe the operation and show the actual schematics of the preferred version of integrated circuit 120 in great detail. Relevant information regarding the overall system implemented on that chip and the preferred communication protocol and command structure is repeated below.

Preferred system embodiments of the EPROM Touch Memory™ system function as read/write data carriers that identify and store relevant information about fastener 100 or the apparatus (e.g., power tool 160) to which it is attached. Due to the advantages associated with using Dallas Semiconductor's one-wire™ technology, which is described inter alia in U.S. Pat. No. 5,210,846 (DSC-83) and U.S. patent application Ser. No. 07/725,793 (DSC-175), this information can be accessed with minimal hardware, for example a single port pin of a micro-controller. Preferred system embodiments consist of a factory-lasered registration number that include a unique 48-bit serial number, an 8-bit CRC, and an 8-bit Family Code (09h) plus 1K-bit of EPROM which is user-programmable. The power to program and read preferred system embodiments is derived entirely from the 1-Wire™ communication line. Data is transferred serially via the 1-Wire™ protocol which requires only a single data lead and a ground return. The entire device can be programmed and then write-protected if desired. Alternatively, unprogrammed portions of the part may be programmed with new data with each subsequent programming of the device. Note individual bits can be changed only from a logical 1 to a logical 0, never from a logical 0 to a logical 1. A provision is also included for indicating that a certain page or pages of data are no longer valid and have been replaced with new or updated data that is now residing at an alternate page address. This page address redirection allows software to patch data and enhance the flexibility of the device as a standalone database. The 48-bit serial number that is factory-lasered into each preferred system embodiment provides a guaranteed unique identity which allows for absolute traceability.

Figure 5A:
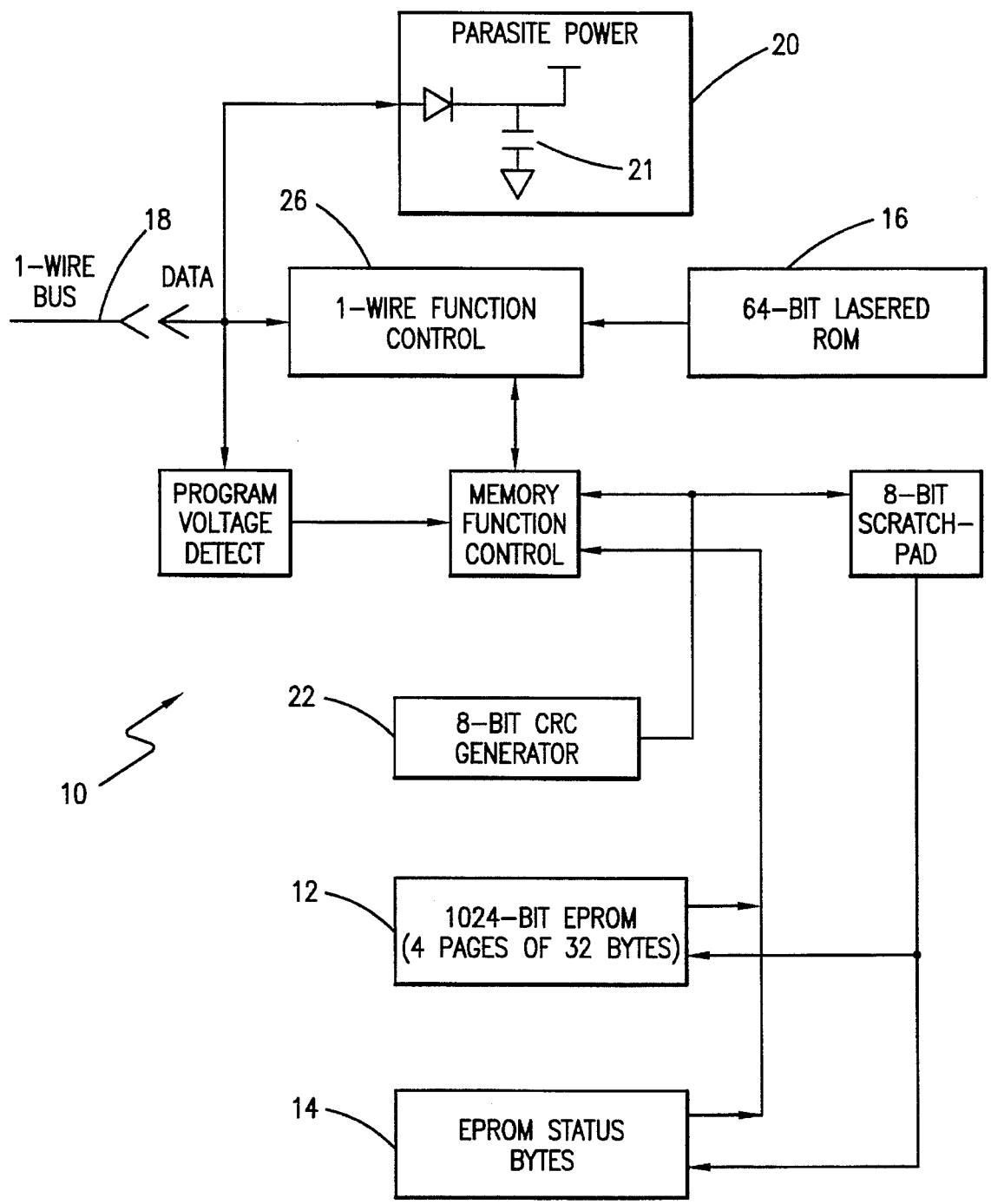
FIG. 5A is a block diagram that shows the relationships between the major control and memory sections of preferred system embodiments.

The block diagram in FIG. 5A shows the relationships between the major control and memory sections of preferred system embodiments 10. Preferred system embodiments 10 generally have three main data components: 1) 64-bit lasered ROM 16, 2) 1024-bit EPROM 12, and 3) EPROM Status Bytes 14. Device 10 derives its power for read operations entirely from the 1-Wire™ communication line 18 by storing energy on an internal capacitor 21 during periods of time when the signal line is high and continues to operate off of this "parasite" power source during the low times of the 1-Wire line until it returns high to replenish the parasite (capacitor) supply 20. During programming, 1-Wire™ communication occurs at normal voltage levels and then is pulsed momentarily to the programming voltage to cause the selected EPROM bits to be programmed. The 1-Wire™ line must be able to provide 12 volts and 10 milliamperes to adequately program the EPROM portions of the part. Whenever programming voltages are present on the 1-Wire™ line a special high voltage detect circuit within the preferred system embodiment 10 generates an internal logic signal to indicate this condition.

Figure 5B:
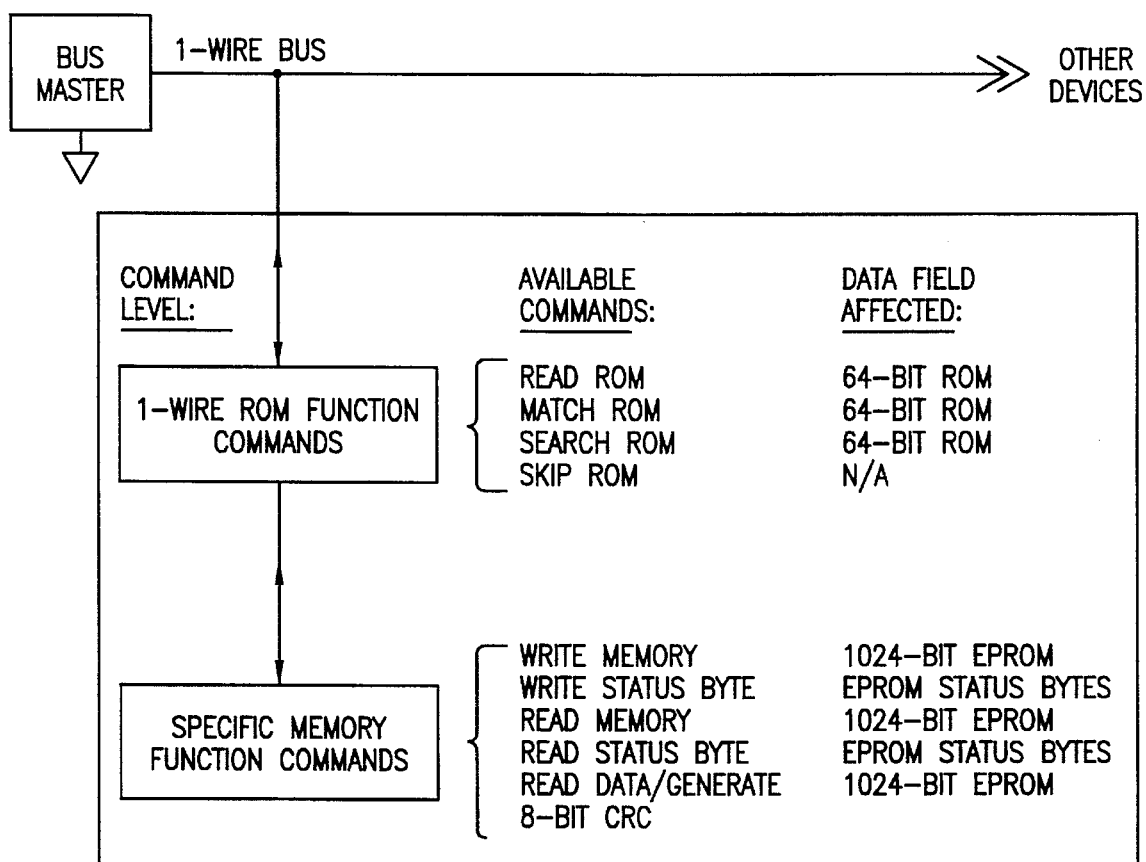
FIG. 5B is an outline showing the hierarchical structure for 1-Wire™ protocol.

The hierarchical structure of the 1-Wire™ protocol is shown in FIG. 5B. The bus master must first provide one of the four ROM Function Commands: 1) Read ROM, 2) Match ROM, 3) Search ROM, 4) Skip ROM. These commands operate on the 64-bit lasered ROM portion of each device and can singulate a specific device if many are present on the 1-Wire™ line as well as indicate to the bus master how many and what types of devices are present. The protocol required for these ROM Function Commands is described in FIG. 5C. After a ROM Function Command is successfully executed, the memory functions that operate on the EPROM portions of the preferred system embodiment become accessible and the bus master may issue any one of the five Memory Function Commands specific to the preferred system embodiment to read or program the various data fields. The protocol for these Memory Function Commands is described in FIGS. 5D, 5E, and 5F. All data is read and written least significant bit first.

Figure 5G:
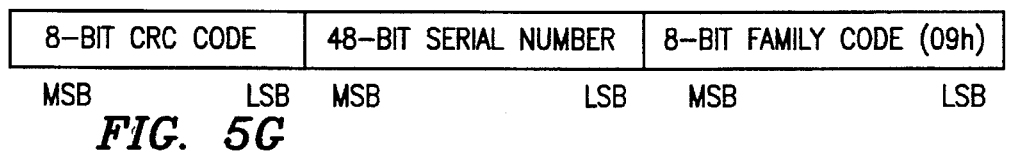
FIG. 5G is a memory map of the 64-Bit Lasered ROM 16 (in FIG. 5A)

Regarding the 64-bit lasered ROM, each preferred system embodiment contains a unique ROM code that is 64 bits long. The first eight bits are a 1-Wire™ family code. The next 48 bits are a unique serial number. Referring to FIG. 5G, the last eight bits are a CRC of the first 56 bits. The 64-bit ROM and ROM Function Control section allow preferred system embodiments to operate as a 1-Wire™ device and follow the 1-Wire™ protocol detailed below. The memory functions required to read and program the EPROM sections of preferred system embodiments are not accessible until the ROM function protocol has been satisfied. This protocol is described in the ROM functions flow chart (FIG. 5C). The 1-Wire™ bus master must first provide one of four ROM function commands; 1) Read ROM, 2) Match ROM, 3) Search ROM, or 4) Skip ROM. After a ROM function sequence has been successfully executed, the bus master may then provide any one of the memory function commands specific to preferred system embodiments (FIGS. 5D, 5E, and 5F).

Figure 5H:
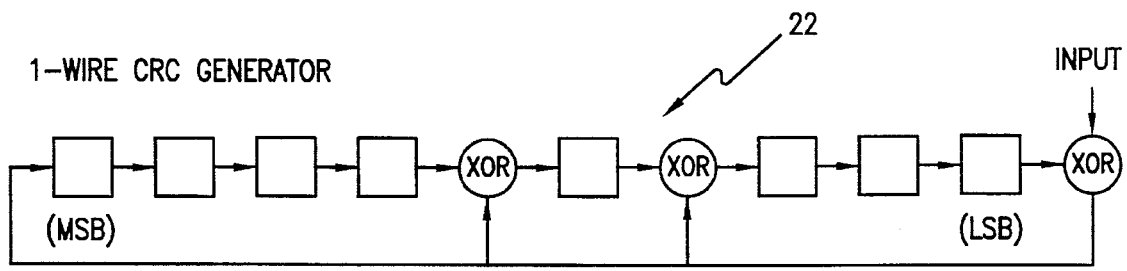
FIG. 5H is state diagram of 1-Wire™ CRC Generator 22 (in FIG. 5A)
Figure 5C:
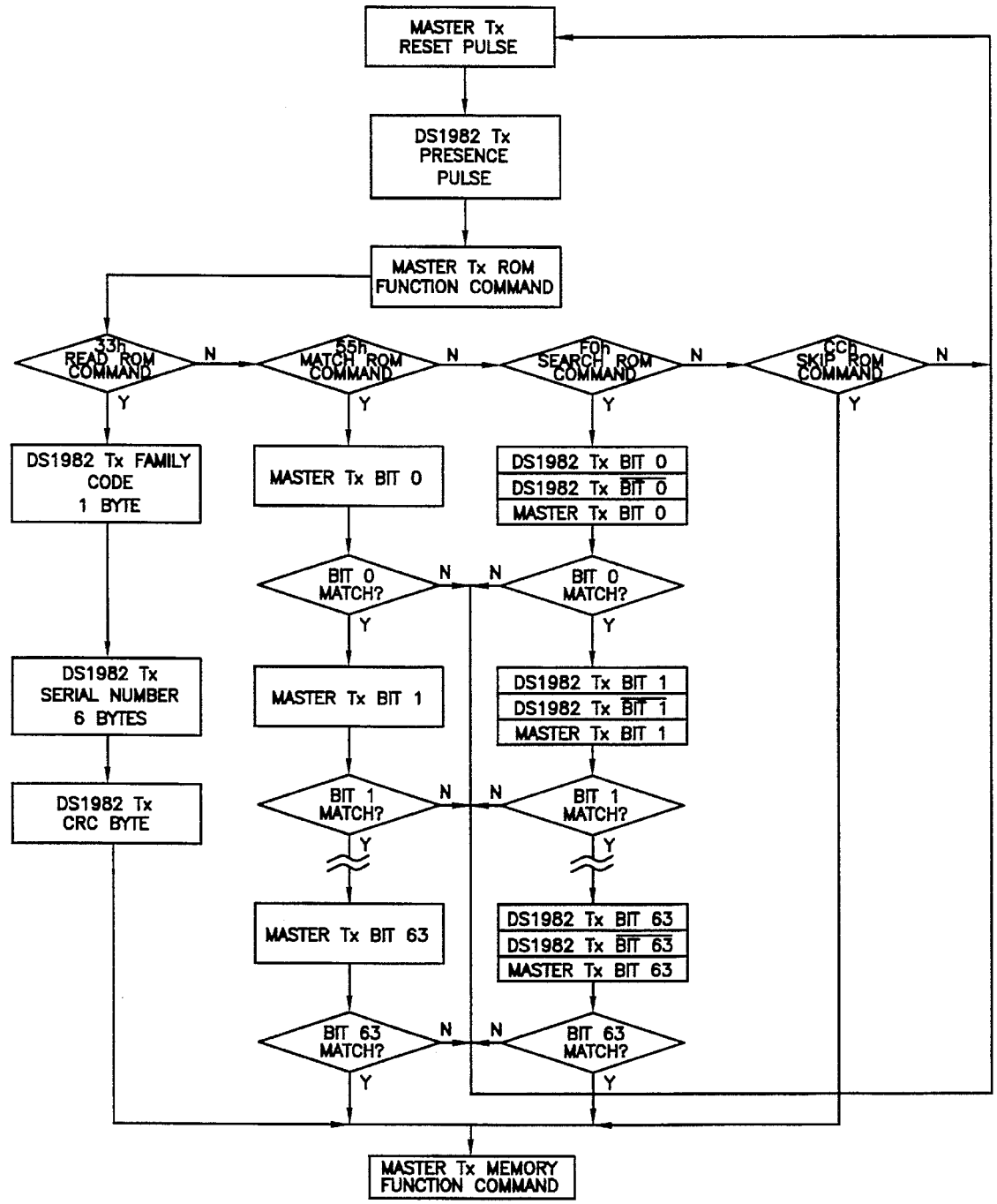
FIG. 5C is a flow chart outlining the protocol required for these ROM Function Commands.
Figure 5D:
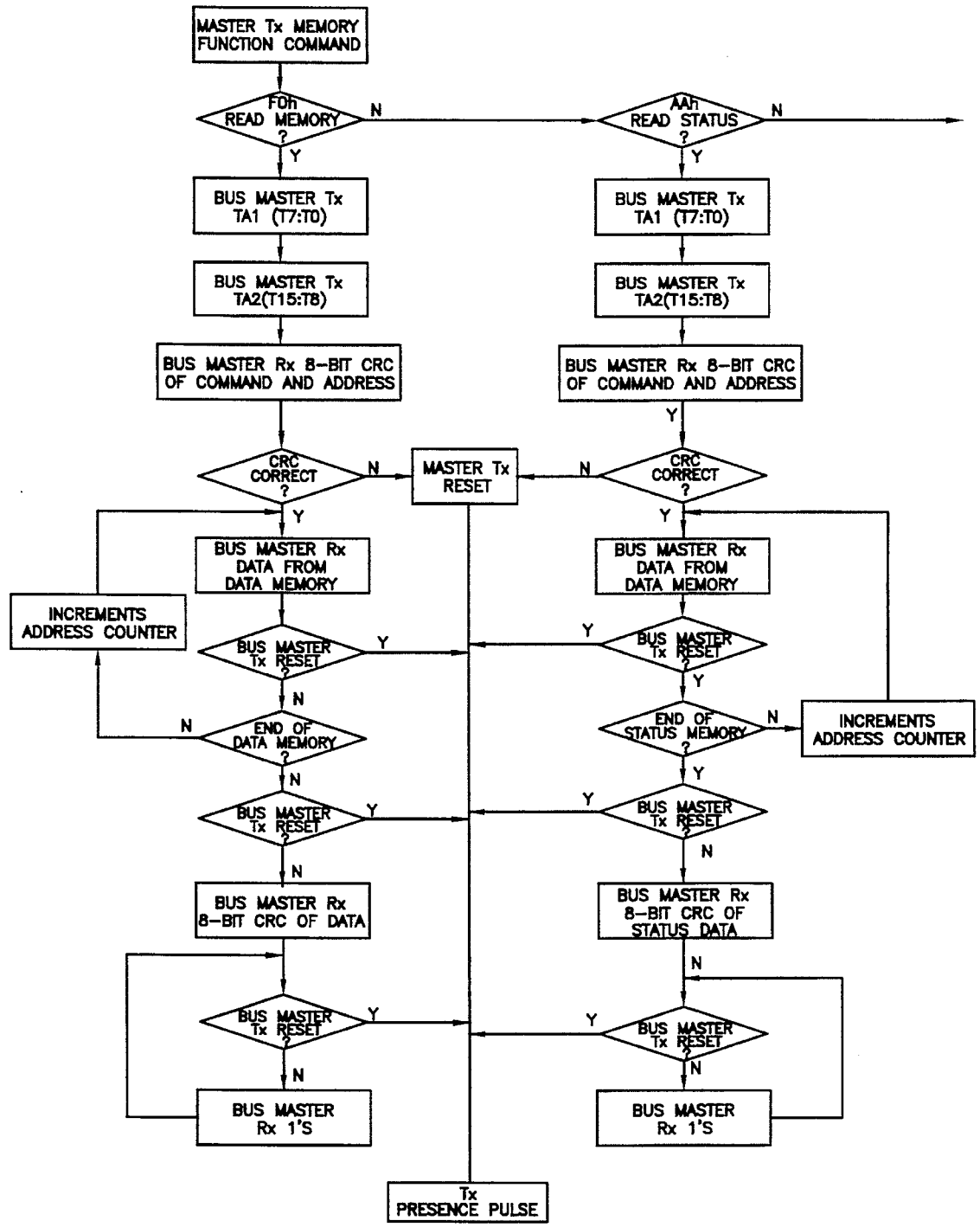
FIGS. 5D, 5E, and 5F is a flow chart outlining the protocol for these Memory Function Commands.
Figure 5E:
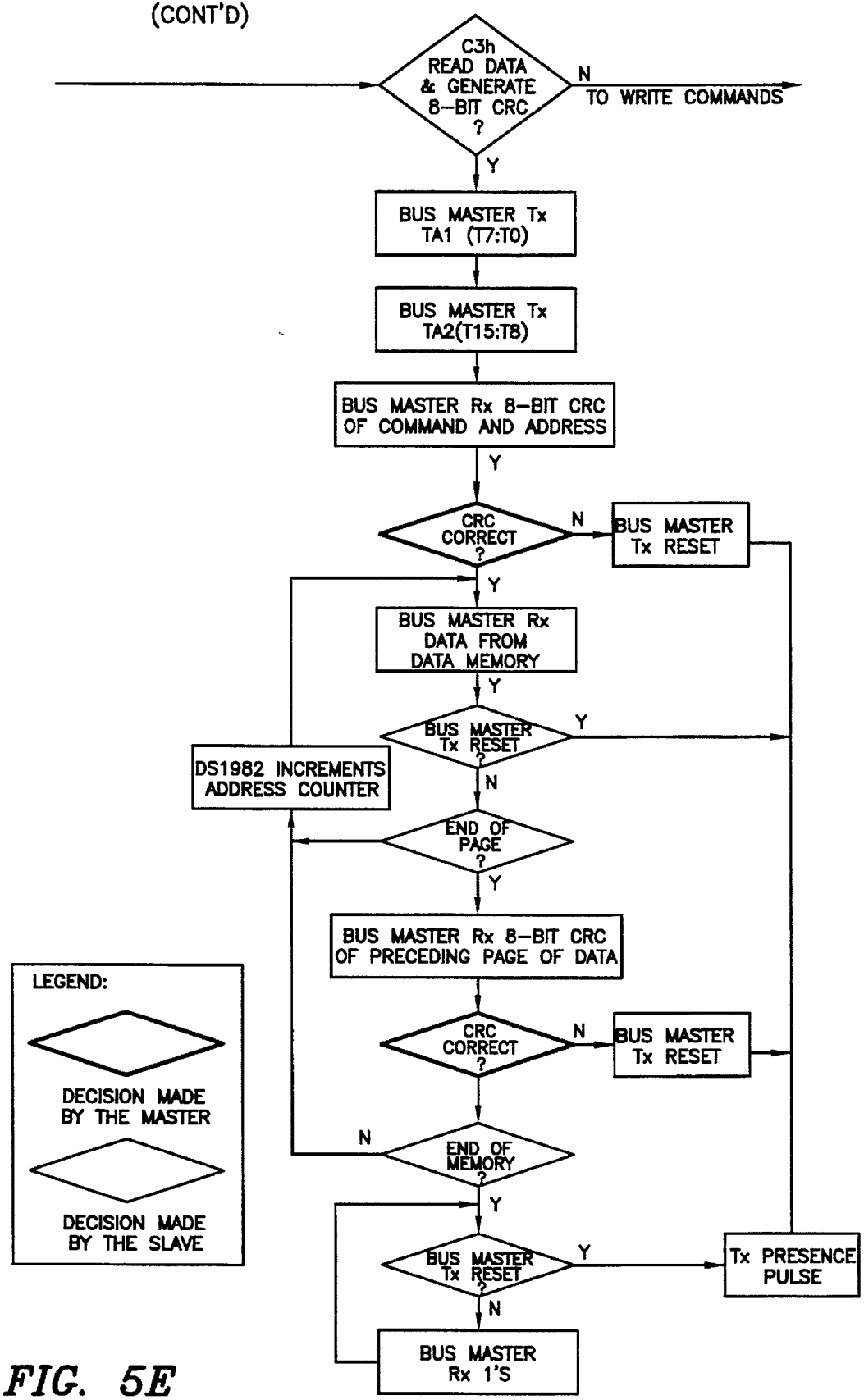
Figure 5F:
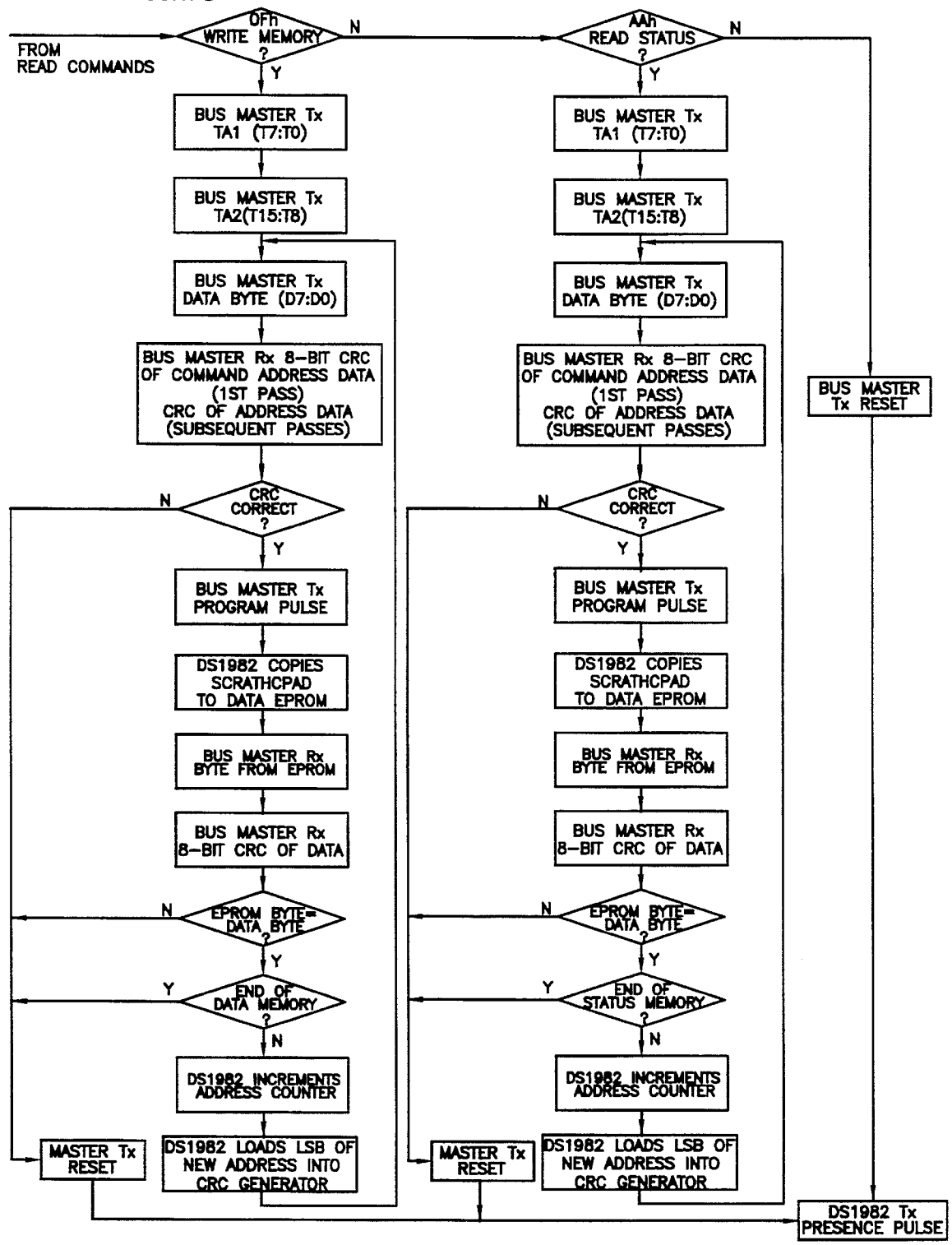
Figure 5I:
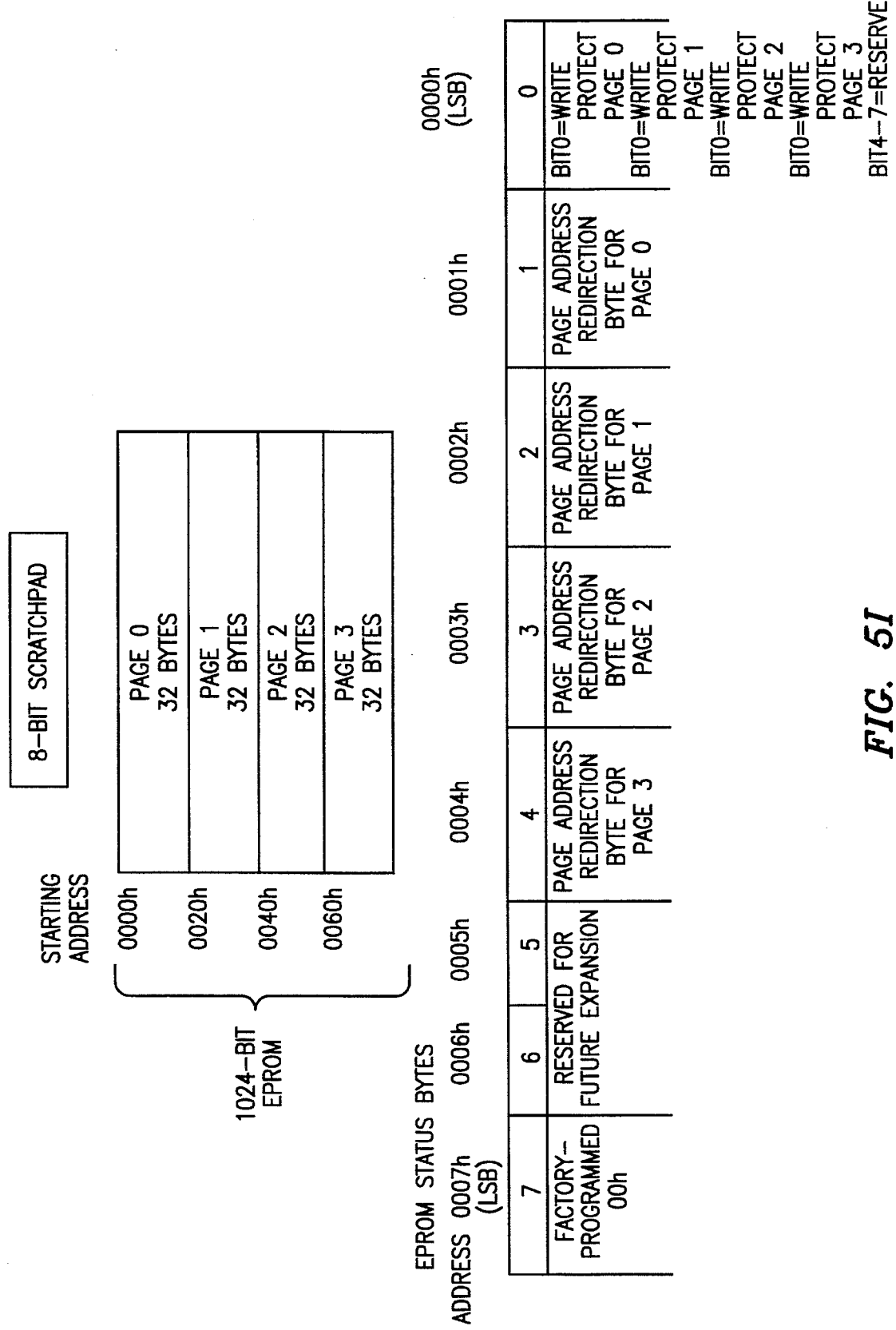
FIG. 5I is a memory map showing the 1024-bit EPROM section of preferred system embodiments that are configured as four pages of 32 bytes each.

The 1-Wire™ CRC of the lasered ROM is generated using the polynomial $X^8+X^5+X^4+1$ (see FIG. 5H). Additional information about the Dallas Semiconductor 1-Wire™ Cycle Redundancy Check is available in the Book of DS19xx Touch Memory Standards, which is incorporated by reference hereinabove and in several of the patents and patent applications incorporated by reference. The shift register acting as the CRC accumulator is initialized to zero. Then starting with the least significant bit of the family code, one bit at a time is shifted in. After the eighth bit of the family code has been entered, then the serial number is entered. After the 48th bit of the serial number has been entered, the shift register contains the CRC value. Shifting in the eight bits of CRC should return the shift register to all zeroes.

Regarding the 1024-BIT EPROM module 12 (in FIG. 5A), the memory map in FIG. 1I shows the 1024-bit EPROM section of the preferred system embodiment which is configured as four pages of 32 bytes each. The 8-bit scratchpad is an additional register that acts as a buffer when programming the memory. Data is first written to the scratchpad and then verified by reading an 8-bit CRC from preferred system embodiments that confirms proper receipt of the data. If the buffer contents are correct, a programming voltage should be applied and the byte of data will be written into the selected address in memory. This process insures data integrity when programming the memory. The details for reading and programming the 1024-bit EPROM portion of preferred system embodiments are given in the Memory Function Commands section.

Regarding EPROM Status Bytes, in addition to the 1024 bits of data memory the preferred system embodiments provides 64 bits of Status Memory accessible with separate commands.

The EPROM Status Bytes can be read or programmed to indicate various conditions to the software interrogating preferred system embodiments. The first byte of the EPROM Status Memory contains the Write Protect Page bits which inhibit programming of the corresponding page in the 1024-bit main memory area if the appropriate write protection bit is programmed. Once a bit has been programmed in the Write Protect Page byte, the entire 32 byte page that corresponds to that bit can no longer be altered but may still be read.

The next four bytes of the EPROM Status Memory contain the Page Address Redirection Bytes which indicate if one or more of the pages of data in the 1024-bit EPROM section have been invalidated and redirected to the page address contained in the appropriate redirection byte. The hardware of the preferred system embodiment makes no decisions based on the contents of the Page Address Redirection Bytes. These additional bytes of Status EPROM allow for the redirection of an entire page to another page address, indicating that the data in the original page is no longer considered relevant or valid. With EPROM technology, bits within a page can be changed from a logical 1 to a logical 0 by programming, but cannot be changed back.

Therefore, it is not possible to simply rewrite a page if the data requires changing or updating, but with space permitting, an entire page of data can be redirected to another page within preferred system embodiments by writing the one's complement of the new page address into the Page Address Redirection Byte that corresponds to the original (replaced) page.

This architecture allows the user's software to make a "data patch" to the EPROM by indicating that a particular page or pages should be replaced with those indicated in the Page Address Redirection Bytes.

If a Page Address Redirection Byte has a FFH value, the data in the main memory that corresponds to that page is valid. If a Page Address Redirection Byte has some other hex value, the data in the page corresponding to that redirection byte is invalid, and the valid data can now be found at the one's complement of the page address indicated by the hex value stored in the associated Page Address Redirection Byte. A value of FDH in the redirection byte for page 1, for example, would indicate that the updated data is now in page 2. The details for reading and programming the EPROM status memories portion of preferred system embodiments is given in the Memory Function Commands section.

Regarding memory function commands, the "Memory Function Flow Chart" (FIG. 5D, 5E, and 5F) describes the protocols necessary for accessing the various data fields within preferred system embodiments. The Memory Function Control section, 8-bit scratchpad, and the Program Voltage Detect circuit combine to interpret the commands issued by the bus master and create the correct control signals within the device. A three-byte protocol is issued by the bus master. It is comprised of a command byte to determine the type of operation and two address bytes to determine the specific starting byte location within a data field. The command byte indicates if the device is to be read or written. Writing data involves not only issuing the correct command sequence but also providing a 12 volt programming voltage at the appropriate times. To execute a write sequence, a byte of data is first loaded into the scratchpad and then programmed into the selected address. Write sequences always occur a byte at a time. To execute a read sequence, the starting address is issued by the bus master and data is read from the part beginning at that initial location and continuing to the end of the selected data field or until a reset sequence is issued. All bits transferred to preferred system embodiments and received back by the bus master are sent least significant bit first.

Regarding READ MEMORY [F0H], the Read Memory command is used to read data from the 1024-bit EPROM data field. The bus master follows the command byte with a two byte address (TA1=(T7:T0), TA2=(T15:T8)) that indicates a starting byte location within the data field. An 8-bit CRC of the command byte and address bytes is computed by the preferred system embodiments and read back by the bus master to confirm that the correct command word and starting address were received. If the CRC read by the bus master is incorrect, a Reset Pulse must be issued and the entire sequence must be repeated. If the CRC received by the bus master is correct, the bus master issues read time slots and receives data from preferred system embodiments starting at the initial address and continuing until the end of the 1024-bit data field is reached or until a Reset Pulse is issued. If reading occurs through the end of memory space, the bus master may issue eight additional read time slots and preferred system embodiments will respond with an 8-bit CRC of all data bytes read from the initial starting byte through the last byte of memory. After the CRC is received by the bus master, any subsequent read time slots will appear as logical 1s until a Reset Pulse is issued. Any reads ended by a Reset Pulse prior to reaching the end of the memory will not have the 8-bit CRC available.

Typically a 16-bit CRC would be stored with each page of data to insure rapid, error-free transfers that eliminate having to read a page multiple times to determine if the received data is correct or not. (See Book of DS19xx Touch Memory Standards, Chapter 7 for the recommended file structure to be used with the 1-Wire™ environment.) If CRC values are imbedded within the data, a Reset Pulse may be issued at the end of memory space during a Read Memory command.

Regarding READ STATUS [AAH], the Read Status command is used to read data from the EPROM Status data field. The bus master follows the command byte with a two byte address (TAi=(T7:T0), TA2=(T15:T8)) that indicates a starting byte location within the data field. An 8-bit CRC of the command byte and address bytes is computed by preferred system embodiments (as shown in FIG. 5H) and readback by the bus master to confirm that the correct command word and starting address were received. If the CRC read by the bus master is incorrect, a Reset Pulse must be issued and the entire sequence must be repeated. If the CRC received by the bus master is correct, the bus master issues read time slots and receives data from the preferred system embodiments starting at the supplied address and continuing until the end of the EPROM Status data field is reached. At that point the bus master will receive an 8-bit CRC that is the result of shifting into the CRC generator all of the data bytes from the initial starting byte through the final factory-programmed byte that contains the 00h value.

This feature is provided since the EPROM Status information may change over time making it impossible to program the data once and include an accompanying CRC that will always be valid. Therefore, the Read Status command supplies an 8-bit CRC that is based on and always is consistent with the current data stored in the EPROM Status data field.

After the 8-bit CRC is read, the bus master will receive logical is from the preferred system embodiments until a Reset Pulse is issued. The Read Status command sequence can be exited at any point by issuing a Reset Pulse.

Regarding the READ DATA/GENERATE 8-BIT CRC [C3H], the Read Data/Generate 8-bit CRC command is used to read data from the 1024-bit EPROM memory field. The bus master follows the command byte with a two byte address (TAI=(T7:T0), TA2=(T15:T8)) that indicates a starting byte location within the data field. An 8-bit CRC of the command byte and address bytes is computed by the preferred system embodiments and read back by the bus master to confirm that the correct command word and starting address were received. If the CRC read by the bus master is incorrect, a Reset Pulse must be issued and the entire sequence must be repeated. If the CRC received by the bus master is correct, the bus master issues read time slots and receives data from the preferred system embodiments starting at the initial address and continuing until the end of a 32-byte page is reached. At that point the bus master will send eight additional read time slots and receive an 8-bit CRC that is the result of shifting into the CRC generator all of the data bytes from the initial starting byte to the last byte of the current page. Once the 8-bit CRC has been received, data is again read from the 1024-bit EPROM 12 data field starting at the next page. This sequence will continue until the final page and its accompanying CRC are read by the bus master. Thus each page of data can be considered to be 33 bytes long, the 32 bytes of user-programmed EPROM data and an 8-bit CRC that gets generated automatically at the end of each page.

This type of read differs from the Read Memory command which simply reads each page until the end of address space is reached. The Read Memory command only generates an 8-bit CRC at the end of memory space that often might be ignored, since in many applications the user would store a 16-bit CRC with the data itself in each page of the 1024-bit EPROM 12 data field at the time the page was programmed.

The Read Data/Generate 8-bit CRC command provides an alternate read capacity for applications that are "bit-oriented" rather than "page-oriented" where the 1024-bit EPROM 12 information may change over time within a page boundary making it impossible to program the page once and include an accompanying CRC that will always be valid. Therefore, the Read Data/Generate 8-Bit CRC command concludes each page with the preferred system embodiments generating and supplying an 8-bit CRC that is based on and therefore is always consistent with the current data stored in each page of the 1024-bit EPROM 12 data field. After the 8-bit CRC of the last page is read, the bus master will receive logical 1s from the preferred system embodiments until a Reset Pulse is issued. The Read Data/Generate 8-Bit CRC command sequence can be exited at any point by issuing a Reset Pulse.

Regarding the WRITE MEMORY [0FH] command, the Write Memory command is used to program the 1024-bit EPROM data field. The bus master will follow the command byte with a two byte starting address (TAi=(T7:T0), TA2=(T15:T8)) and a byte of data (D7:D0). An 8-bit CRC of the command byte, address bytes, and data byte is computed by the preferred system embodiments and read back by the bus master to confirm that the correct command word, starting address, and data byte were received.

If the CRC read by the bus master is incorrect, a Reset Pulse must be issued and the entire sequence must be repeated. If the CRC received by the bus master is correct, a programming pulse (12 volts on the 1-Wire™ bus for 480 us) is issued by the bus master. Prior to programming, the entire unprogrammed 1024-bit EPROM data field will appear as logical 1s. For each bit in the data byte provided by the bus master that is set to a logical 0, the corresponding bit in the selected byte of the 1024-bit EPROM 12 will be programmed to a logical 0 after the programming pulse has been applied at the byte location.

After the 480 us programming pulse is applied and the data line returns to a 5 volt level, the bus master issues eight read time slots to verify that the appropriate bits have been programmed. The preferred system embodiments responds with the data from the selected EPROM address sent least significant bit first. This byte contains the logical AND of all bytes written to this EPROM data address. If the EPROM data byte contains 1s in bit positions where the byte issued by the master contains 0s, a Reset Pulse should be issued and the current byte address should be programmed again. If the preferred system embodiments EPROM data byte contains 0s in the same bit position as the data byte, the programming was successful and the preferred system embodiments will automatically increment its address counter to select the next byte in the 1024-bit EPROM 12 data field. The least significant byte of the new two-byte address will also be loaded into the 8-bit CRC generator as a starting value. The bus master will issue the next byte of data using eight write time slots.

As the preferred system embodiments receives this byte of data into the scratchpad, it also shifts the data into the CRC generator that has been preloaded with the LSB of the current address and the result is an 8-bit CRC of the new data byte and the LSB of the new address. After supplying the data byte, the bus master will read this 8-bit CRC from the preferred system embodiments with eight read time slots to confirm that the address incremented properly and the data byte was received correctly. If the CRC is correct, the bus master will issue a programming pulse and the selected byte in memory will be programmed.

Note that the initial pass through the Write Memory flow chart will generate an 8-bit CRC value that is the result of shifting the command byte into the CRC generator, followed by the two address bytes, and finally the data byte. Subsequent passes through the Write Memory flow chart due to the preferred system embodiments automatically incrementing its address counter will generate an 8-bit CRC that is the result of loading (not shifting) the LSB of the new (incremented) address into the CRC generator and then shifting in the new data byte.

For both of these cases, the decision to continue (to apply a program pulse to the preferred system embodiments) is made entirely by the bus master, since the preferred system embodiments will not be able to determine if the 8-bit CRC calculated by the bus master agrees with the 8-bit CRC calculated by the preferred system embodiments. If an incorrect CRC is ignored and a program pulse is applied by the bus master, incorrect programming could occur within the preferred system embodiments. Also note that the preferred system embodiments will always increment its internal address counter after the receipt of the eight read time slots used to confirm the programming of the selected EPROM byte. The decision to continue is again made entirely by the bus master, therefore if the EPROM data byte does not match the supplied data byte but the master continues with the Write Memory command, incorrect programming could occur within the preferred system embodiments. The Write Memory command sequence can be exited at any point by issuing a Reset Pulse.

Regarding WRITE STATUS [55H], the Write Status command is used to program the EPROM Status data field. The bus master will follow the command byte with a two byte starting address (TAi=(T7:T0), TA2=(T15:T8)) and a byte of status data (D7:D0). An 8-bit CRC of the command byte, address bytes, and data byte is computed by the preferred system embodiments and read back by the bus master to confirm that the correct command word, starting address, and data byte were received.

If the CRC read by the bus master is incorrect, a Reset Pulse must be issued and the entire sequence must be repeated. If the CRC received by the bus master is correct, a programming pulse (12 volts on the 1-Wire™ bus for 480 us) is issued by the bus master. Prior to programming, the first seven bytes of the EPROM Status 14 data field will appear as logical 1s. For each bit in the data byte provided by the bus master that is set to a logical 0, the corresponding bit in the selected byte of the EPROM STATUS BYTE data field will be programmed to a logical 0 after the programming pulse has been applied at that byte location. The eighth byte of the EPROM Status Byte data field is factory-programmed to contain 00h.

After the 480 us programming pulse is applied and the data line returns to a 5 volt level, the bus master issues eight read time slots to verify that the appropriate bits have been programmed. The preferred system embodiments responds with the data from the selected EPROM Status address sent least significant bit first. This byte contains the logical AND of all bytes written to this EPROM Status Byte address. If the EPROM Status Byte contains is in bit positions where the byte issued by the master contained 0s, a Reset Pulse should be issued and the current byte address should be programmed again. If the preferred system embodiments EPROM Status Byte contains 0s in the same bit positions as the data byte, the programming was successful and the preferred system embodiments will automatically increment its address counter to select the next byte in the EPROM Status data field. The least significant byte of the new two-byte address will also be loaded into the 8-bit CRC generator as a starting value. The bus master will issue the next byte of the data using eight write time slots.

As the preferred system embodiments receives this byte of data into the scratchpad, it also shifts the data into the CRC generator that has been preloaded with the LSB of the current address and the result is an 8-bit CRC of the new data byte and the LSB of the new address. After supplying the data byte, the bus master will read this 8-bit CRC from the preferred system embodiments with eight read time slots to confirm that the address incremented properly and the data byte was received correctly. If the CRC is incorrect, a Reset Pulse must be issued and the Write Status command sequence must be restarted. If the CRC is correct, the bus master will issue a programming pulse and the selected byte in memory will be programmed.

Note that the initial pass through the Write Status flow chart will generate an 8-bit CRC value that is the result of shifting the command byte into the CRC generator, followed by the two address bytes, and finally the data byte. Subsequent passes through the Write Status flow chart due to the preferred system embodiments automatically incrementing its address counter will generate an 8-bit CRC that is the result of loading (not shifting) the LSB of the new (incremented) address into the CRC generator and then shifting in the new data byte.

For both of these cases, the decision to continue (to apply a program pulse to the preferred system embodiments) is made entirely by the bus master, since the preferred system embodiments will not be able to determine if the 8-bit CRC calculated by the bus master agrees with the 8-bit CRC calculated by the preferred system embodiments. If an incorrect CRC is ignored and a program pulse is applied by the bus master, incorrect programming could occur within the preferred system embodiments. Also note that the preferred system embodiments will always increment its internal address counter after the receipt of the eight read time slots used to confirm the programming of the selected EPROM byte. The decision to continue is again made entirely by the bus master, therefore if the EPROM data byte does not match the supplied data byte but the master continues with the Write Status command, incorrect programming could occur within the preferred system embodiments. The Write Status command sequence can be ended at any point by issuing a Reset Pulse.

Regarding the 1-Wire™ bus system 18, the 1-Wire™ bus 18 is a system which has a single bus master and one or more slaves. In all instances, the preferred system embodiments is a slave device. The bus master is typically a micro-controller. The discussion of this bus system is broken down into three topics; hardware configuration, transaction sequence, and 1-Wire™ signalling (signal type and timing). A 1-Wire™ protocol defines bus transactions in terms of the bus state during specified time slots that are initiated on the falling edge of sync pulses from the bus master. For a more detailed protocol description, refer to Chapter 4 of the Book of DS19xx Touch Memory Standards, which is incorporated by reference.

Regarding the preferred hardware configuration, the 1-Wire™ bus 18 has only a single line by definition; it is important that each device on the bus be able to drive it at the appropriate time. To facilitate this, each device attached to the 1-Wire™ bus must nave an open drain connection or 3-state outputs. The preferred system embodiments is an open drain part with an internal circuit equivalent to that shown in FIG. 1J. The bus master 26 can be the same equivalent circuit. If a bidirectional pin is not available, separate output and input pins can be tied together.

The bus master 26 requires a pull-up resistor at the master end of the bus, with the bus master 26 circuit equivalent to the one shown in FIG. 1K. The value of the pull-up resistor should be approximately 5 kohms for short line lengths.

A multidrop bus consists of a 1-Wire™ bus with multiple slaves attached. The 1-Wire™ bus 18 (in FIG. 5A) has a maximum data rate of 16.3 k bits per second. If the bus master 26 is also required to perform programming of the EPROM portions of the preferred system embodiments, a programming supply capable of delivering up to 10 milliamps at 12 volts for 480 us is required. The idle state for the 1-Wire™ bus is high. If, for any reason, a transaction needs to be suspended, the bus MUST be left in the idle state if the transaction is to resume. If this does not occur and the bus is left low for more than 120 us, one or more of the devices on the bus may be reset.

Regarding the transaction sequence, the sequence for accessing the preferred system embodiments via the 1-Wire™ port is as follows: Initialization, ROM Function Command, Memory Function Command, and Read/Write Memory/Status.

Regarding initialization, all transactions on the 1-Wire™ bus begin with an initialization sequence. The initialization sequence consists of a reset pulse transmitted by the bus master 26 followed by a presence pulse(s) transmitted by the slave(s).

The presence pulse lets the bus master 26 know that the preferred system embodiment is on the bus and is ready to operate. For more details, see the description below regarding "1-Wire™ Signalling."

Regarding ROM FUNCTION COMMANDS, once the bus master 26 has detected a presence, it can issue one of the four ROM function commands. All ROM function commands are eight bits long. A list of these commands follows (refer to flowchart in FIG. 5C).

Regarding Read ROM [33H], this command allows the bus master 26 to read the preferred system embodiment's 8-bit family code, unique 48-bit serial number, and 8-bit CRC. This command can be used only if there is a single preferred system embodiment on the bus. If more than one slave is present on the bus, a data collision will occur when all slaves try to transmit at the same time (open drain will produce a wired-AND result).

Regarding Match ROM [55H], the match ROM command, followed by a 64-bit ROM sequence, allows the bus master 26 to address a specific preferred system embodiment on a multidrop bus. Only the preferred system embodiment that exactly matches the 64-bit ROM sequence will respond to the subsequent memory function command. All slaves that do not match the 64-bit ROM sequence will wait for a reset pulse. This command can be used with a single or multiple devices on the bus.

Regarding Skip ROM [CCH], this command can save time in a single drop bus system by allowing the bus master 26 to access the memory functions without providing the 64-bit ROM code. If more than one slave is present on the bus and a read command is issued following the Skip ROM command, data collision will occur on the bus as multiple slaves transmit simultaneously (open drain pull-downs will produce a wire-AND result).

Regarding Search ROM [F0H], when a system is initially brought up, the bus master 26 might not know the number of devices on the 1-Wire™ bus or their 64-bit ROM codes. The search ROM command allows the bus master 26 to use a process of elimination to identify the 64-bit ROM codes of all slave devices on the bus. The ROM search process is the repetition of a simple 3-step routine: read a bit, read the complement of the bit, then write the desired value of that bit. The bus master 26 performs this simple, 3-step routine on each bit of the ROM. After one complete pass, the bus master 26 knows the contents of the ROM in one device. The remaining number of devices and their ROM codes may be identified by additional passes. See Chapter 5 for a comprehensive discussion of a ROM search, including an actual example.

Regarding 1-Wire™ Signalling, the preferred system embodiment requires strict protocols to insure data integrity. The protocol consists of five types of signalling on one line: Reset Sequence with Reset Pulse and Presence Pulse, Write 0, Write 1, Read Data and Program Pulse. All these signals except presence pulse are initiated by the bus master 26. The initialization sequence required to begin any communication with the preferred system embodiments is shown in FIG. 5N. A reset pulse followed by a presence pulse indicates the preferred system embodiments is ready to accept a ROM command. The bus master 26 transmits (TX) a reset pulse (tPDH, 15–60 us) and then transmits the present pulse (tPDL, 60–240 us).

Figure 5L:
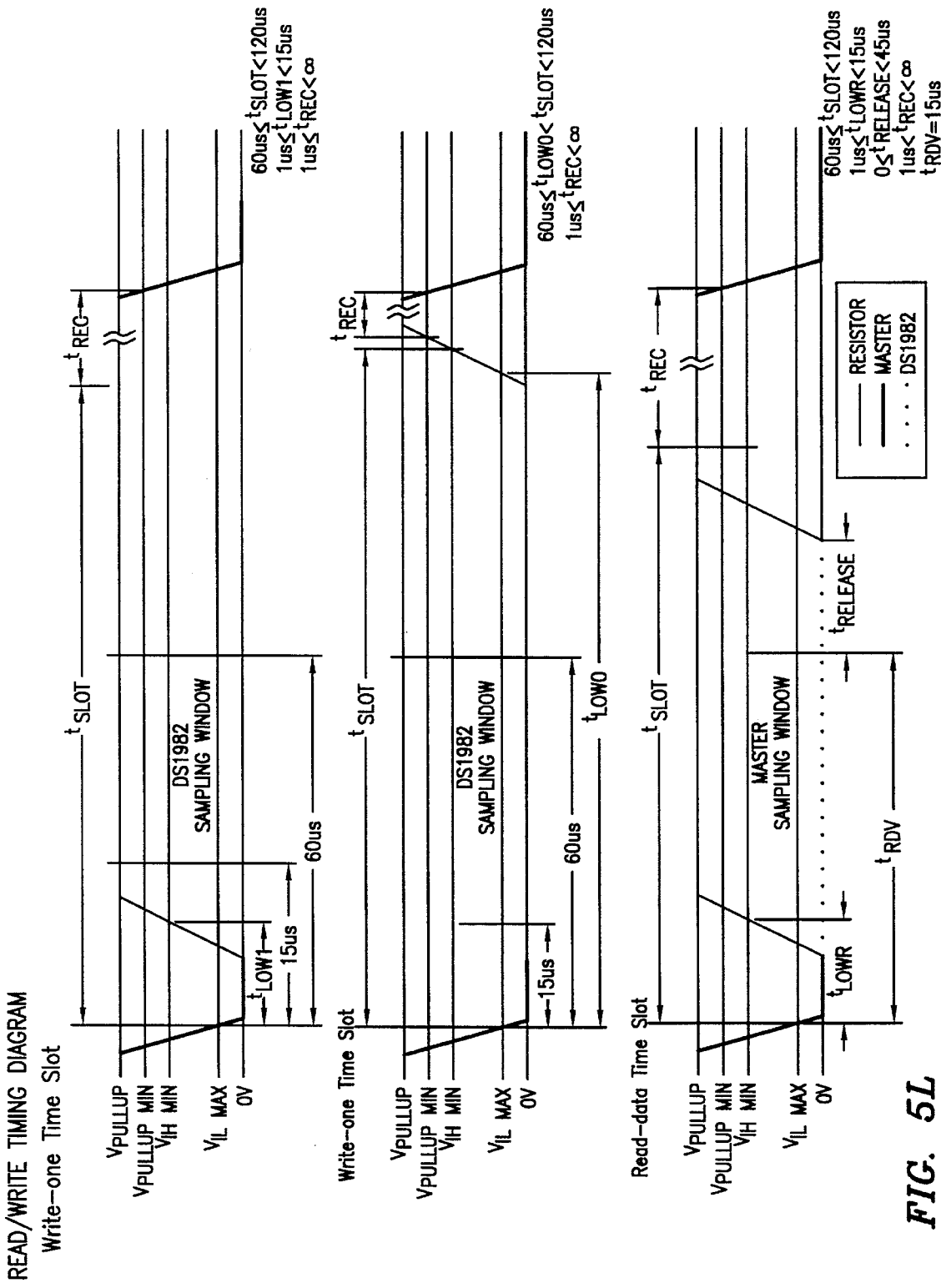
FIG. 5L is a series of timing diagrams showing, inter alia, the definitions of read/Write Time Slots.

Regarding Read/Write Time Slots, the definitions of write and read time slots are illustrated in FIG. 5L. All time slots are initiated by the master driving the data line low. The falling edge of the data line synchronizes the preferred system embodiments to the master by triggering a delay circuit in the preferred system embodiments. During write time slots, the delay circuit determines when the preferred system embodiments will sample the data line. For a read data time slot, if a "0" is to be transmitted, the delay circuit determines how long the preferred system embodiments will hold the data line low overriding the 1 generated by the master. If the data bit is a "1," the preferred system embodiments will leave the read data time slot unchanged.

Figure 5M:
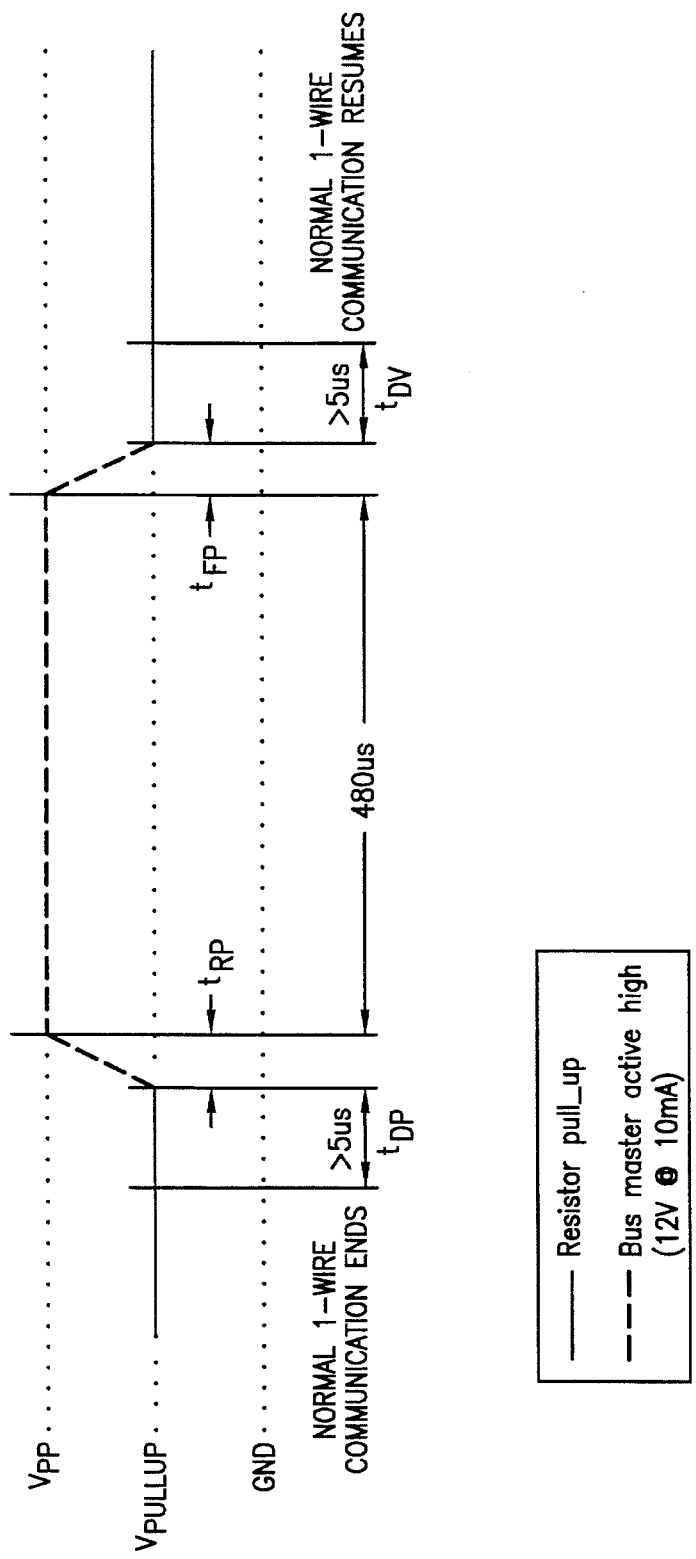
FIG. 5M is a timing diagram showing the application of a programming voltage.
Figure 50:
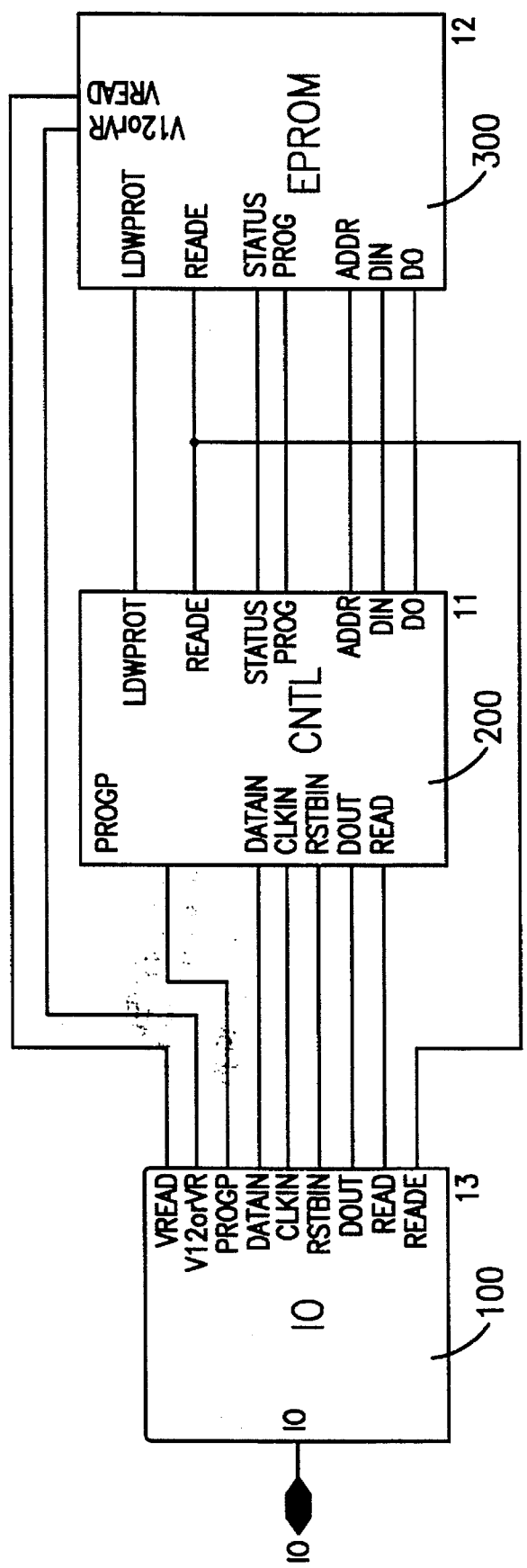
FIG. 50 is a block diagram showing the architecture of a preferred embodiment of device 10, which generally comprises input/output ("IO") module 100 coupled to control ("CNTL") module 200, which are both coupled to EPROM memory ("EPROM") module 300.

Regarding the program pulse, to copy data from the 8-bit scratchpad to the EPROM Data or Status Memory, a program pulse of 12 volts is applied to the data line after the bus master 26 has confirmed that the CRC for the current byte is correct. During programming, the bus master 26 controls the transition from a state where the data line is idling high via the pull-up resistor to a state where the data line is actively driven to a programming voltage of 12 volts providing a minimum of 10 mA of current to the preferred system embodiments. This programming voltage (FIG. 5M) should be applied for 480 us, after which the bus master 26 returns the data line to an idle high state controlled by the pull-up resistor. Note that due to high voltage programming requirements for any 1-Wire™ EPROM device, it is not possible to multi-drop non-EPROM based 1-Wire™ devices with the preferred system embodiments during programming. An internal diode within the non-EPROM based 1-Wire™ devices will attempt to clamp the data line at approximately 8 volts and could potentially damage these devices.

Regarding CRC GENERATION, preferred system embodiments have an 8-bit CRC in the most significant byte of the 64-bit ROM. The bus master 26 can compute a CRC value from the first 56 bits of the 64-bit ROM and compare it to the value stored within the preferred system embodiments to determine if the ROM data has been received error-free by the bus master 26. The equivalent polynomial function of this CRC is: $X^8+X^5+X^4+1$.

Under certain conditions, the preferred system embodiments also generate an 8-bit CRC value using the same polynomial function shown above and provides this value to the bus master 26 to validate the transfer of command, address, and data bytes from the bus master 26 to the preferred system embodiments. The Memory Function Flow Chart of FIGS. 5D, 5E, and 5F indicates that the preferred system embodiments compute an 8-bit CRC for the command, address, and data bytes received for the Write Memory and the Write Status commands and then output this value to the bus master 26 to confirm proper transfer. Similarly the preferred system embodiments compute an 8-bit CRC for the command and address bytes received from the bus master 26 for the Read Memory, Read Status, and Read Data/Generate 8-Bit CRC commands to confirm that these bytes have been received correctly. The CRC generator on the preferred system embodiments is also used to provide verification of error-free data transfer as each page of data from the 1024-bit EPROM is sent to the bus master 26 during a Read Data/Generate 8-Bit CRC command, and for the eight bytes of information in the status memory field.

In each case where a CRC is used for data transfer validation, the bus master 26 must calculate a CRC value using the polynomial function given above and compare the calculated value to either the 8-bit CRC value stored in the 64-bit ROM portion of the preferred system embodiments (for ROM reads) or the 8-bit CRC value computed within the preferred system embodiments. The comparison of CRC values and decision to continue with an operation are determined entirely by the bus master 26. There is no circuitry on the preferred system embodiments that prevents a command sequence from proceeding if the CRC stored in or calculated by the preferred system embodiments does not match the value generated by the bus master 26. Proper use of the CRC as outlined in the flow chart of FIG. 5D, 5E, and 5F can result in a communication channel with a very high level of integrity. For more details on generating CRC values including example implementations in both hardware and software, see the Book of DS19xx Touch Memory Standards, which is incorporated by reference.

FIG. 5O is a block diagram showing the architecture of a Preferred embodiment of device 10, which generally comprises input/output ("IO") module 100 coupled to control ("CNTL") module 200, which are both coupled to EPROM memory ("EPROM") module 300. As discussed, detailed schematics of each major block can be found in U.S. patent application Ser. No. 08/262,071 (DSC-419). U.S. patent application Ser. No. 08/342,068 (DSC-461), as discussed therein, provides a similar architecture with a number of enhancements.

Further Modification and Variations

Although the invention has been described with reference to a specific embodiment, this description is not meant to be construed in a limiting sense. In particular, novel aspects of the inventions described above and shown in the drawings may stand alone and/or be selectively combined in an overall system. In other words, while preferred embodiments may incorporate most or all of the features described above, alternate preferred embodiments may only incorporate a selected number of the features, depending upon the application. As described above, various modifications of the disclosed embodiment as well as alternate embodiments of the invention will become apparent to persons skilled in the art upon reference to the description of the invention. For instance, additional conductive surfaces (beyond the first and second conductive surfaces/contacts disclosed) could be added to provide additional electrical contacts housed therein. Naturally, it is preferred that the additional surfaces would be insulated from one another. Accordingly, it should be understood that the modifications and variations suggested above and below are not intended to be exhaustive. These examples help show the scope of the inventive concepts, which are covered in the appended claims. The appended claims are intended to cover these modifications and alternate embodiments. In particular, permanent ID records, maintenance, warranty information, calibration or baseline set-up data, event monitoring, etc. may be stored in the memory found in integrated circuit 120. In addition, please note that while preferred systems employ electrically programmable read only memory, other forms of electrically programmable memory can be used as well. For instance, E$^2$PROM can be used as well. In addition, Moreover, please note that while inventions described above are discussed in conjunction with one another, alternate embodiments may only incorporate some of the preferred features and innovations or different combinations of preferred features and innovations described above without departing from the spirit and scope of the inventions claimed below. Similarly, while preferred embodiments are packaged plastic packages, alternate packages are possible as well, such as token-shaped modules. Additionally, while preferred embodiments of integrated circuit 120 utilize the DS1982, alternate preferred embodiments may use the DS1990, DS1991, DS1992 or similar parts using Dallas Semiconductor's Touch Memory™ technology. Note operational differences, memory organization, and memory type may vary among the parts discussed above, but are explained in the data. sheets of each part, which are herein incorporated by reference and adaptible to the configuration shown in FIGS. 1A, 1B, 2, 3, and 4. Finally, while preferred embodiments use only a first contact 112 and second contact 116 to communicate information, alternate preferred embodiments may use additional contact (by splitting out the clock and data signals) and still use the 1-wire™ technology or alternate technologies and protocols, such as I$^2$C.

What is claimed is:

1. A communication system, comprising:
   (a) a first fastener having a first coupling end, said first fastener having an integrated circuit positioned to be electrically coupled to a first communication interface on said first coupling end of said fastener;
   (b) a second fastener having a second coupling end, said second coupling end having a second communication interface, said first communication interface and said second communication interface electrically coupled together when said first fastener and said second fastener are fastened together.

2. The communication system of claim 1, wherein said first fastener comprises a hollow cavity therethrough and said integrated circuit is positioned inside said first fastener, at least one electrical signal line exists through said hollow cavity in communication with said integrated circuit.

3. The communication system of claim 1, wherein said integrated circuit is packaged in a plastic package having at least two leads extending therefrom, one of said at least two leads being coupled to an electrical signal line.

4. The communication system of claim 1, wherein said integrated circuit comprises:
   an energy source connection;
   a memory electrically coupled to said energy source connection;
   an input logic operatively electrically coupled to said first communication interface; and
   output logic electrically coupled to said memory and adapted to output information in response to a signal received at said first communication interface.

5. The communication system of claim 4, wherein said output logic is comprised of an active device adapted to selectably pull a conductor between said first communication interface and said second communication interface from a first voltage to a second voltage, said output logic being electrically coupled to said memory and to said energy source connection.

6. The communication system of claim 4, wherein at least one second signal line is electrically coupled to said second end of said second fastener.

7. The communication system of claim 1, wherein said second communication interface is electrically coupled to a host system.

8. The communication system of claim 6, wherein said second signal line is electrically coupled to motorized apparatus in a power tool electrically and mechanically coupled to said second fastener.

9. A coupler, comprising
   (a) a first coupling end; and
   (b) an integrated circuit incorporated into said coupler to be electrically connected to a first communication interface on said first coupling end of said coupler, so that a second coupler having a second coupling end and a second communication interface can be coupled to said coupler and electrically contact said first communication interface.

10. A method comprising the steps of:
    (a) coupling a first fastener and a second fastener together;
    (b) receiving and transmitting information via a first signal line and a second signal line extending through said first fastener and said second fastener to an integrated circuit positioned in said first fastener.

\* \* \* \* \*

UNITED STATES PATENT AND TRADEMARK OFFICE
CERTIFICATE OF CORRECTION

| | | |
|---|---|---|
| PATENT NO. : | 5,615,130 | Page 1 of 2 |
| DATED : | Mar. 25, 1997 | |
| INVENTOR(S) : | Bolan et al. | |

It is certified that error appears in the above-indentified patent and that said Letters Patent is hereby corrected as shown below:

| | |
|---|---|
| Column 1, line 21 | Replace "tile" With --the-- |
| Column 2, line 62 | Replace "kines" With --lines-- |
| Column 4, line 1 | Replace "Trader" With --Trade,-- |
| Column 10, line 17 | Replace "(TAi=" With --(TA1=-- |
| Column 10, line 49 | Replace "(TAI=" With --(TA1=-- |
| Column 11, line 24 | Replace "is" With --1s-- |
| Column 11, line 31 | Replace "(TAi=" With --(TA1=-- |
| Column 12, line 45 | Replace "(TAi=" With --(TA1=-- |

UNITED STATES PATENT AND TRADEMARK OFFICE
CERTIFICATE OF CORRECTION

PATENT NO. : 5,615,130
DATED : Mar. 25, 1997
INVENTOR(S) : Bolan et al.

It is certified that error appears in the above-indentified patent and that said Letters Patent is hereby corrected as shown below:

Column 14, line 8  Replace "nave"
With --have--

Column 16, line 50  Replace "Preferred"
With --preferred--

Column 16, line 61  Replace "Modification"
With --Modifications--

Column 17, line 26  Replace "Moreover,"
With --moreover,--

Column 17, line 41  Replace "data."
With --data--

Signed and Sealed this

Twenty-eighth Day of October, 1997

Attest:

BRUCE LEHMAN

Attesting Officer

Commissioner of Patents and Trademarks